(12) United States Patent
Miyazaki et al.

(10) Patent No.: US 9,915,979 B2
(45) Date of Patent: Mar. 13, 2018

(54) INPUT DEVICE, DISPLAY DEVICE, ELECTRONIC DEVICE, AND MOBILE TERMINAL

(71) Applicant: KYOCERA Corporation, Kyoto-shi, Kyoto (JP)

(72) Inventors: Yoshio Miyazaki, Kirishima (JP); Kouji Tsurusaki, Kirishima (JP); Katsuya Chaen, Kirishima (JP); Hiroshi Tokumori, Kirishima (JP); Natsuko Yamagata, Kirishima (JP)

(73) Assignee: KYOCERA Corporation, Kyoto-shi, Kyoto (JP)

( * ) Notice: Subject to any disclaimer, the term of this patent is extended or adjusted under 35 U.S.C. 154(b) by 843 days.

(21) Appl. No.: 14/386,976

(22) PCT Filed: Mar. 21, 2013

(86) PCT No.: PCT/JP2013/058054
§ 371 (c)(1),
(2) Date: Sep. 22, 2014

(87) PCT Pub. No.: WO2013/141292
PCT Pub. Date: Sep. 26, 2013

(65) Prior Publication Data
US 2015/0062456 A1    Mar. 5, 2015

(30) Foreign Application Priority Data

Mar. 21, 2012  (JP) ................................ 2012-063720

(51) Int. Cl.
*G06F 3/041*  (2006.01)
*G06F 3/044*  (2006.01)
*G06F 1/16*   (2006.01)

(52) U.S. Cl.
CPC ............ *G06F 1/1643* (2013.01); *G06F 3/044* (2013.01); *G06F 3/0412* (2013.01); *G06F 2203/04111* (2013.01)

(58) Field of Classification Search
CPC .................................. G06F 3/041; G06F 3/044
See application file for complete search history.

(56) References Cited

U.S. PATENT DOCUMENTS

2011/0141034 A1* 6/2011 Lai .......................... G06F 3/041
                                                           345/173
2012/0262385 A1* 10/2012 Kim ....................... G06F 3/044
                                                           345/173

FOREIGN PATENT DOCUMENTS

JP        2011-090443 A       5/2011

OTHER PUBLICATIONS

International Search Report (Form PCT/ISA/210) dated Jun. 18, 2013 issued for PCT/JP2013/058054.

* cited by examiner

*Primary Examiner* — Ilana Spar
*Assistant Examiner* — Nguyen H Truong
(74) *Attorney, Agent, or Firm* — Volpe and Koenig, P.C.

(57) ABSTRACT

[Object] To provide an input device, a display device, an electronic device, and a mobile terminal such that the reliability of the electrical connection between a detection wiring and a wiring board can be improved.

[Solution] An input device X1 includes a substrate 2, a first colored layer 6 that is provided on the substrate 2, a first detection electrode 3a that is provided on the substrate 2, a detection wiring 8 that is provided on the first colored layer 6 and is electrically connected to the first detection electrode 3a, and a wiring board 10 that is electrically connected to the detection wiring 8 through an adhesive member T1 containing conductive particles P1, the detection wiring 8 extends (Continued)

from a position on the first colored layer 6 to a position on a part of the substrate 2 in which the first colored layer 6 is not included, and if the detection wiring 8 located on a part of the substrate 2 in which the first colored layer 6 is not included is an extension section 8*a*, the adhesive member T1 is located between the extension section 8*a* and the wiring board 10.

19 Claims, 20 Drawing Sheets

INPUT DEVICE, DISPLAY DEVICE, ELECTRONIC DEVICE, AND MOBILE TERMINAL

TECHNICAL FIELD

The present invention relates to an input device, a display device, an electronic device, and a mobile terminal.

BACKGROUND ART

In recent years, a capacitive touch panel that detects an input operation by capturing a change in capacitance between the finger and a detection electrode has been known as an input device. In such an input device, for example, a colored layer and the detection electrode are provided on a substrate. Further, a detection wiring that is electrically connected to the detection electrode is provided on the colored layer (for example, see PTL 1). Further, the detection wiring is electrically connected to a wiring board containing conductive particles through an adhesive member.

CITATION LIST

Patent Literature

PTL 1: Japanese Unexamined Patent Application Publication No. 2011-90443

SUMMARY OF INVENTION

Technical Problem

However, when attempting to electrically connect the detection wiring and the wiring board in a manufacturing procedure of the input device in the related art, it was necessary to press the adhesive member located between the wiring board and the detection wiring by applying a pressure to the detection wiring from the wiring board. However, in the input device in the related art, a colored layer is provided below the detection wiring. Therefore, there is a possibility of the pressure applied to the detection wiring from the wiring board being reduced by the colored layer. Therefore, if the pressure is reduced, there is a possibility of the reliability of the electrical connection between detection wiring and a wiring board being reduced, without sufficiently pressing an adhesive member.

The present invention has been made in view of such a circumstance, and an object thereof is to provide an input device, a display device, an electronic device, and a mobile terminal, in which the reliability of the electrical connection between a detection wiring and a wiring board can be improved.

Solution to Problem

According to an aspect of the present invention, there is provided an input device including a substrate; a first colored layer that is provided on the substrate; detection electrode that is provided on the substrate; a detection wiring that is provided on the first colored layer and is electrically connected to the detection electrode; and a wiring board that is electrically connected to the detection wiring through an adhesive member containing conductive particles, in which the detection wiring extends from a position on the first colored layer to a position on a part of the substrate in which the first colored layer is not included, and in which the adhesive member is located between the wiring board and an extension section of the detection wiring located on a part of the substrate in which the first colored layer is not included.

According to another aspect of the present invention, there is provided an electronic device including the display device according to the present invention and a housing in which the display device is accommodated.

According to still another aspect of the present invention, there is provided a mobile terminal including the display device according to the present invention, a voice input unit, a voice output unit; and a housing in which the display device, the voice input unit, and the voice output unit are accommodated.

Advantageous Effects of Invention

According to the present invention, a following effect is achieved, and according to an input device, a display device, an electronic device, and a mobile terminal of the present invention, the reliability of the electrical connection between detection wiring and a wiring board can be improved.

DESCRIPTION OF EMBODIMENTS

Hereinafter, embodiments of the present invention will be described with reference to the drawings.

However, the respective drawings referred to below later illustrate simplified main parts required for describing the present invention for convenience of description, among the components of an embodiment of the present invention. Thus, the input device, the display device, the electronic device, and the mobile terminal according to the present invention may include any components which are not illustrated in the respective drawings referenced in the present specification.

Figure 1:
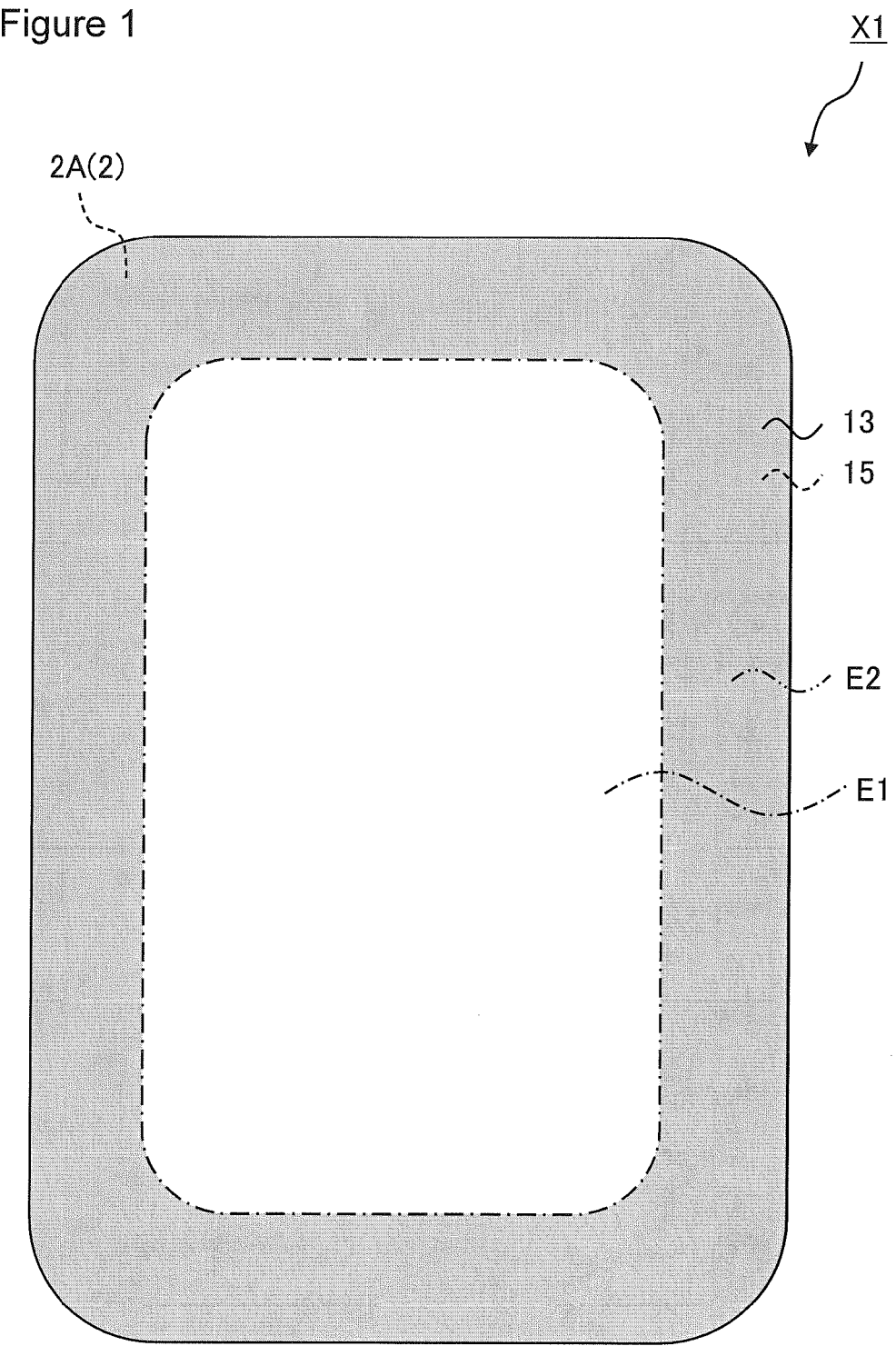
FIG. 1 is a plan view illustrating a schematic configuration of an input device according to the present embodiment.
Figure 2:
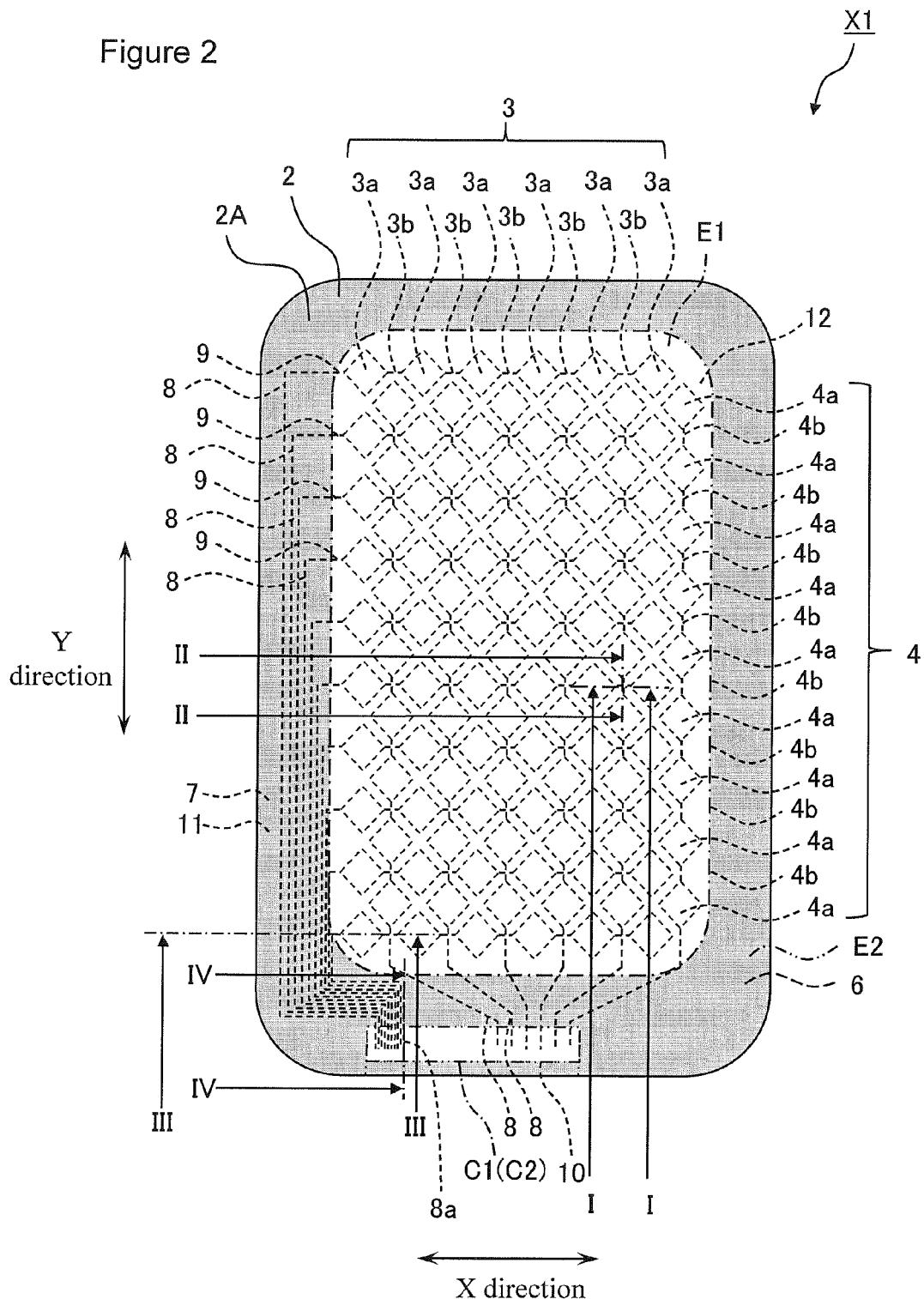
FIG. 2 is a plan view illustrating a schematic configuration of the input device according to the present embodiment, and a perspective view of the substrate.
Figure 3:
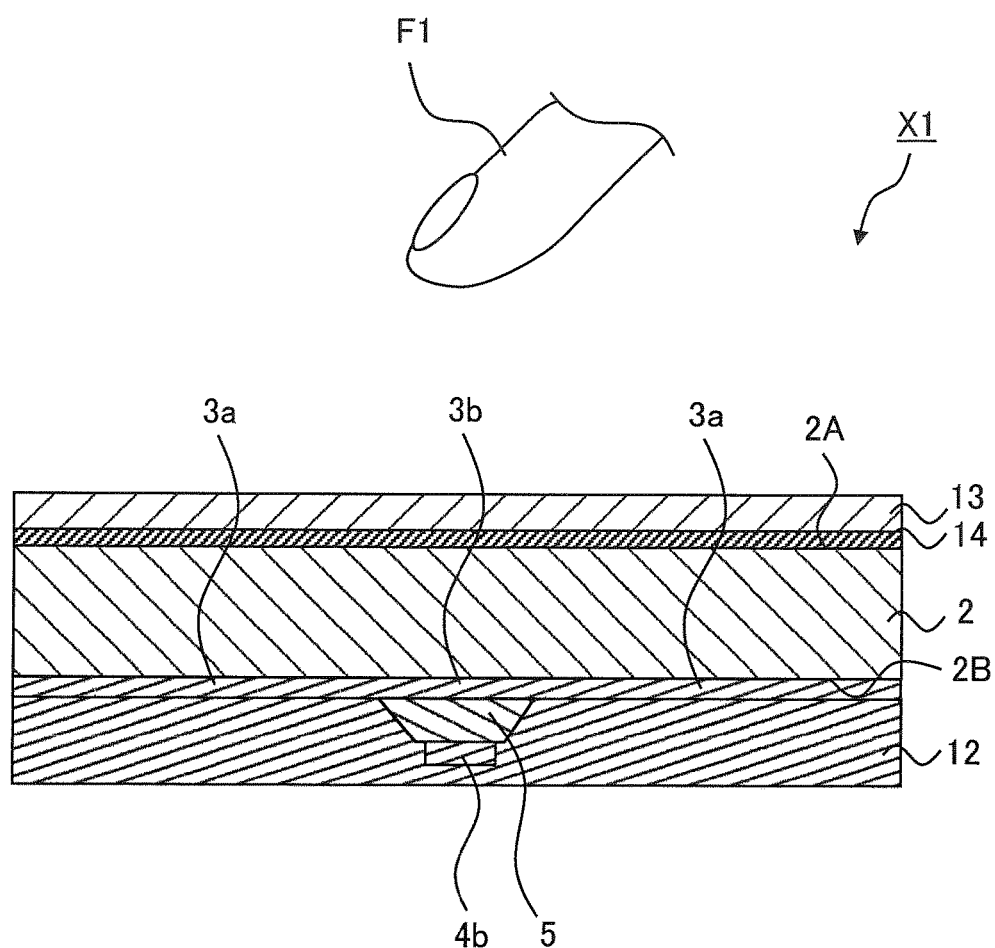
FIG. 3 is a sectional view taken along line I-I illustrated in FIG. 2.
Figure 4:
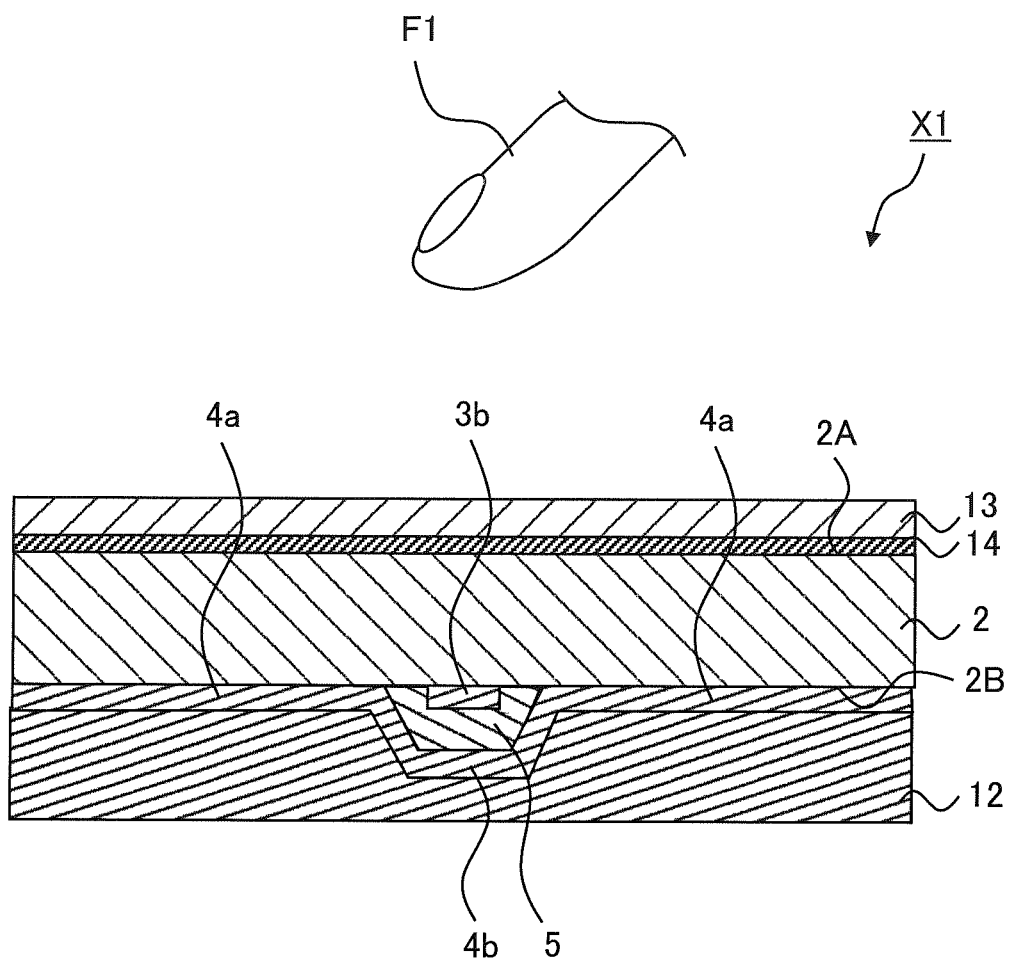
FIG. 4 is a sectional view taken along line II-II illustrated in FIG. 2.
Figure 5:
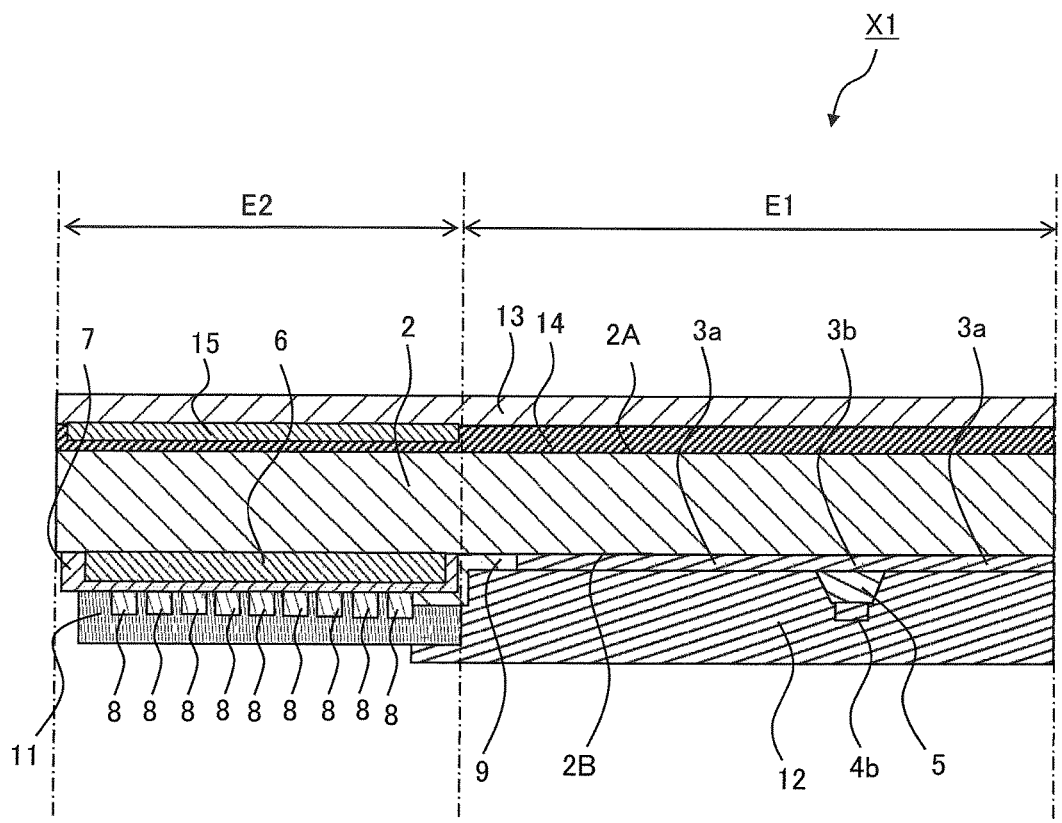
FIG. 5 is a sectional view taken along line III-III illustrated in FIG. 2.

As illustrated in FIG. 1 and FIG. 2, an input device X1 according to the present embodiment is a projection-type capacitive touch panel, and includes an input area E1 and a non-input area E2. The input area E1 is an area in which the user can perform an input operation. The non-input area E2 is an area in which the user cannot perform an input operation. The non-input area E2 surrounds the input area E1. In other words, the non-input area E2 is located outside of the input area E1. In addition, the non-input area E2 may be located inside the input area E1. Further, the input device X1 is not limited to the projection-type capacitive touch panel, but may be, for example, a surface-type capacitive touch panel or a resistive film-type touch panel. Here, when the present invention is applied to the resistive film-type touch panel, resistive films on two substrates facing each other correspond to "detection electrodes" of the present invention.

Further, the input device X1 is a cover glass integrated type touch panel in the present embodiment, but is not limited thereto. For example, the input device X1 may be a laminated type, an on-cell type or an in-cell type touch panel.

As illustrated in FIGS. 1 to 6, the input device X1 includes a substrate 2.

The substrate 2 has a function of supporting a first detection electrode pattern 3, a second detection electrode pattern 4, an insulator 5, a first colored layer 6, a first protective layer 7, a detection wiring 8, a connection wiring 9, a wiring board 10, a second protective layer 11, a third protective layer 12, a protective sheet 13, an adhesive layer 14, and a second colored layer 15. In addition, in FIG. 2, for convenience of description, the illustration of the insulator 5, the protective sheet 13, the adhesive layer 14, and the second colored layer 15 is omitted.

The substrate 2 includes a first main surface 2A and a second main surface 2B. The first main surface 2A is located closer to an input operation side than the second main surface 2B. The second main surface 2B is located on the side opposite to the first main surface 2A. In the present embodiment, the outer shape of the substrate 2 is substantially rectangular in plan view. In addition, the outer shape of the substrate 2 may be a substantially polygonal shape, a substantially circular shape, or the like in plan view.

The substrate 2 has an insulating property. The substrate 2 has a light-transmitting property with respect to light incident in a direction intersecting the first main surface $2a$ and the second main surface $2b$. In addition, the "light-transmitting property" in the present specification means a property of transmitting some or all of the visible light.

The constituent material of the substrate 2 is glass. In particular, glass that is chemically strengthened by ion exchange for improving strength is preferable. Here, if the substrate 2 is the chemically strengthened glass, it is assumed that the chemically strengthened layer is also included in the substrate 2. In addition, plastic may be employed instead of glass, as the constituent material of the substrate 2. The first detection electrode pattern 3 has a function of detecting an input position in a long side direction (Y direction in FIG. 2) of the substrate 2 in plan view by generating a capacitance between a finger F1 of the user approaching the first main surface 2A of the substrate 2 corresponding to the input area E1 and itself. A plurality of first detection electrode patterns 3 are provided while being arranged in the Y direction, on the second main surface 2B of the substrate 2 corresponding to the input area E1. Further, the first detection electrode pattern 3 includes a first detection electrode $3a$ and first inter-electrode wiring $3b$.

The first detection electrode $3a$ has a function of generating a capacitance between the finger F1 of the user and itself. A plurality of first detection electrodes $3a$ are provided while being arranged in a short side direction (X direction in FIG. 2) of the substrate 2 in plan view. The first inter-electrode wiring $3b$ has a function of electrically connecting the first detection electrodes $3a$ with each other. The first inter-electrode wiring $3b$ is provided between the first detection electrodes $3a$ adjacent to each other.

The second detection electrode pattern 4 has a function of detecting an input position in the X direction by generating a capacitance between the finger F1 of the user approaching the first main surface 2A of the substrate 2 corresponding to the input area E1 and itself. A plurality of second detection electrode patterns 4 are provided while being arranged in the X direction, on the second main surface 2B of the substrate 2 corresponding to the input area E1. Further, the second detection electrode pattern 4 includes a second detection electrode $4a$ and a second inter-electrode wiring $4b$.

The second detection electrode $4a$ has a function of generating a capacitance between the finger F1 of the user and itself. A plurality of second detection electrodes $4a$ are provided while being arranged in the Y direction. The second inter-electrode wiring $4b$ has a function of electrically connecting the second detection electrodes $4a$ with each other. The second inter-electrode wiring $4b$ is provided on the insulator 5 across the insulator 5 so as to be insulated from the first inter-electrode wiring $3b$, between the second detection electrodes $4a$ adjacent to each other. Here, the insulator 5 is provided on the second main surface 2B of the substrate 2 so as to cover the first inter-electrode wiring $3b$. Examples of the constituent material of the insulator 5 include, for example, transparent resin such as acrylic resin, epoxy resin, silicone resin, silicon dioxide, or silicon nitride.

In addition, the first detection electrode $3a$ and the second detection electrode $4a$ according to the present embodiment are substantially diamond-shaped in plan view, but are not limited thereto, and may be a substantially polygonal shape, a substantially circular shape, or the like in plan view.

Examples of the constituent material of the first detection electrode pattern 3 and the second detection electrode pattern 4 include a conductive member having a light-transmitting property. Examples of the conductive member having a light-transmitting property include for example, indium tin oxide (ITO), indium zinc oxide (IZO), Al-doped zinc oxide (ATO), tin oxide, zinc oxide, or conductive polymers.

Films of, for example, materials described above are formed on the second main surface 2B of the substrate 2 by using a sputtering method, a vapor deposition method, or a chemical vapor deposition (CVD) method, as the formation method of the first detection electrode pattern 3 and the second detection electrode pattern 4. Then, the first detection electrode pattern 3 and the second detection electrode pattern 4 are formed by a film being patterned by applying a photosensitive resin to the surface of the film, and being subjected to an exposure process, a development process and an etching process.

The first colored layer 6 has a function of decorating the input device X1. Further, the first colored layer 6 has a function of shielding light incident in a direction intersecting the first main surface 2A and the second main surface 2B of the substrate 2. The first colored layer 6 is provided on the second main surface 2B of the substrate 2 corresponding to the non-input area E2. In addition, a part of the first colored layer 6 may be provided on the second main surface 2B of the substrate 2 corresponding to the input area E1. In the present embodiment, the constituent material of the first colored layer 6 is a resin material containing a coloring material. Thus, the substrate 2 made of glass is harder than the first colored layer 6. In addition, "the substrate 2 being harder than the first colored layer 6" means for example, "the elastic modulus of the substrate 2 being higher than the elastic modulus of the first colored layer 6". In other words, when the substrate 2 and the first colored layer 6 are pressed in a predetermined area and with a predetermined load, the deformation amount of the substrate 2 may be smaller than the deformation amount of the first colored layer 6.

The longitudinal elastic modulus of the first colored layer 6 may be set to, for example, 0.01 to 20 GPa. In contrast, the longitudinal elastic modulus of the substrate 2 may be set to, for example, 60 to 150 GPa. In addition, the longitudinal elastic moduli of the first colored layer 6 and the substrate 2 are not limited to the numerical range described above.

Examples of the resin material include, for example, acryl based resin, epoxy based resin, or silicone based resin. Examples of the coloring material include, for example, carbon, titanium, or chromium. In addition, the first colored layer 6 is not limited to black, but may be colored to a color other than black. Examples of a method of forming the first colored layer 6 include, for example, a screen printing method, a sputtering method, a CVD method, or a vapor deposition method.

A first cut-out portion C1 is provided in a part of the first colored layer 6. In the present embodiment, a part of the first colored layer 6 opens in plan view. The first cut-out portion C1 refers to the entire area which opens. In addition, the first colored layer 6 may have a substantially concave shape in plan view. In this case, the first cut-out portion C1 refers to the entire area which is concave. In addition, in the present embodiment, the first colored layer 6 located at the periphery of the first cut-out portion C1 in plan view is referred to as a first edge portion 6a.

The first protective layer 7 has a function of protecting the first colored layer 6. Here, examples of the function of protecting the first colored layer 6 include, for example, a function of protecting the first colored layer 6 from corrosion by moisture absorption or a function of reducing a possibility of a change in the quality of the material of the first colored layer 6. The first protective layer 7 is provided on the second main surface 2B of the substrate 2. The first protective layer 7 is provided on the first colored layer 6. Examples of the constituent material of the first protective layer 7 include, for example, acryl based resin, silicone based resin, rubber based resin, urethane based resin, or inorganic compounds containing silicon. Examples of forming the first protective layer 7 include, for example, a transfer printing method, a spin coating method, or a slit coating method.

A second cut-out portion C2 is provided in a part of the first protective layer 7. In the present embodiment, a part of the first protective layer 7 opens in plan view. The second cut-out portion C2 refers to the entire area which opens. Further, the second cut-out portion C2 is provided corresponding to the first cut-out portion C1. Specifically, the second cut-out portion C2 overlaps the first cut-out portion C1 in plan view. In addition, in the present embodiment, the entirety of the second cut-out portion C2 overlaps the first cut-out portion C1 in plan view, but is not limited thereto, and a part of the second cut-out portion C2 overlaps the first cut-out portion C1 in plan view. In addition, the first protective layer 7 may have a substantially concave shape in plan view. In this case, the second cut-out portion C2 refers to the entire area which is concave. In addition, in the present embodiment, the first protective layer 7 located at the periphery of the second cut-out portion C2 in plan view is referred to as a second edge portion 7a. The detection wiring 8 has a function of detecting a change in the capacitance generated between the first detection electrode pattern 3 or the second detection electrode pattern 4 and the finger F1. The detection wiring 8 is electrically connected to the first detection electrode pattern 3 or the second detection electrode pattern 4 through the connection wiring 9. Here, the connection wiring 9 is provided on the second main surface 2B of the substrate 2. The connection wiring 9 is located from the input area E1 to the non-input area E2. Examples of the constituent material and the formation method of the connection wiring 9 include those similar to the first detection electrode pattern 3 and the second detection electrode pattern 4.

At least a part of the detection wiring 8 is provided on the second main surface 2B of the substrate 2 corresponding to the non-input area E2. Specifically, at least a part of the detection wiring 8 is provided on the first protective layer 7. Therefore, at least a part of the detection wiring 8 overlaps the first colored layer 7 in plan view. Therefore, when the input device X1 is incorporated into a display device Y1 (see FIG. 7), it is possible to reduce a possibility that the detection wiring 8 is viewed by the user by light emitted from a backlight 300 to the input device X1. In addition, the detection wiring 8 may be provided directly on the first colored layer 6.

The detection wiring 8 is made of a thin metal film such that the detection wiring 8 is hard and has high stability of shape. Examples of the constituent material of the thin metal film include, for example, an aluminum film, an aluminum alloy film, a laminated film of a chromium film and an aluminum film, a laminated film of a chromium film and an aluminum alloy film, a silver film, a silver alloy film, or a gold alloy film. Examples of a method of forming a thin metal film include, for example, a sputtering method, a CVD method, or a vapor deposition method.

Figure 6:
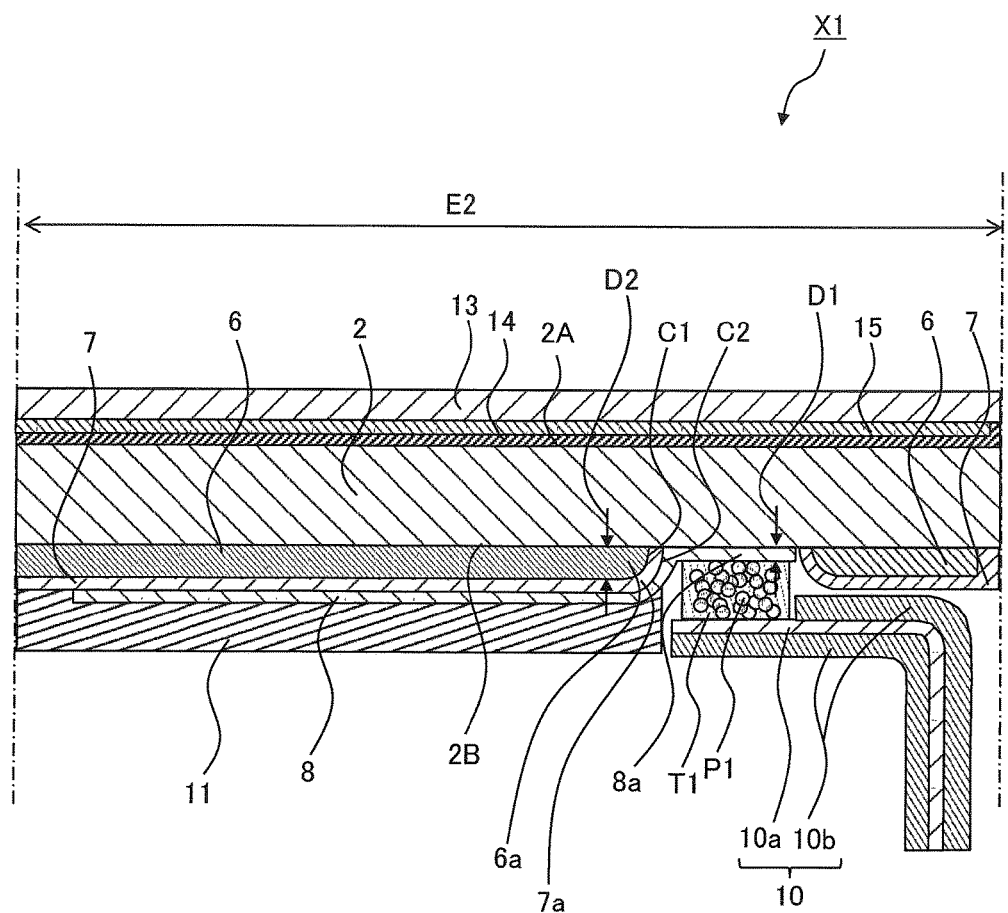
FIG. 6 is a sectional view taken along line IV-IV line illustrated in FIG. 2.

Further, as illustrated in FIG. 6, the detection wiring 8 extends from the first colored layer 6 to a part of the second main surface 2B of the substrate 2 in which the first colored layer 6 is not included. Here, the detection wiring 8 located on the second main surface 2B of the substrate 2 in which the first colored layer 6 and the first protective layer 7 are not included is referred to as an extension section 8*a*. In the present embodiment, the extension section 8*a* overlaps the first cut-out portion C1 in plan view. Further, in the present embodiment, the extension section 8*a* overlaps the second cut-out portion C2 in plan view.

The wiring board 10 has a function of electrically connecting the detection wiring 8 and a position detection driver, which is not shown. The wiring board 10 includes a wiring layer 10*a* and an insulating layer 10*b*. A part of the wiring layer 10*a* is covered with the insulating layer 10*b* and a remaining part is exposed from the insulating layer 10*b*. For example, it is possible to use a flexible printed wiring board as the wiring board 10. Further, the wiring layer 10*a* exposed from the insulating layer 10*b* is electrically connected to the extension section 8*a* through an adhesive member T1 containing the conductive particles P1. Specifically, the adhesive member T1 is located between the extension section 8*a* and the wiring layer 10*a* of the wiring board 10. As the adhesive member T1 containing the conductive particles P1, it is possible to use an anisotropic conductive member or an isotropic conductive member of a well-known related art.

However, in a manufacturing method of an input device of the related art, when a detection wiring and a wiring board are electrically connected, it is necessary to press the adhesive member located between the wiring board and the extension section of the detection wiring, by applying a pressure to the extension section of the detection wiring from the wiring board. In other words, in order to electrically connect the extension section of the detection wiring and the wiring board, it is necessary to press the conductive particles contained in the adhesive member to the extension section of the detecting wiring by pressing the adhesive member. Here, in the input device in the related art, there is a first colored layer below the extension section of the detection wiring. If there is the first colored layer below the extension section of the detection wiring, when the extension section of the detection wiring and the wiring board are electrically connected, there is possibility of a pressure applied to the extension section of the detection wiring from the wiring board being reduced by the first colored layer. Specially, as the present embodiment, when the substrate is harder than the first colored layer, deformation is likely to occur in the first colored layer. Therefore, there is a high possibility of the pressure applied to the extension section of the detection wiring from the wiring board being reduced by the first colored layer. If the pressure applied to the extension section of the detection wiring from the wiring board is reduced by the first colored layer, there is a possibility that the conductive particles contained in the adhesive member will not be sufficiently pressed to the extension section of the detection wiring.

Further, if attempting to sufficiently press the conductive particles contained in the adhesive member to the extension section of the detection wiring, the pressure applied to the extension section of the detection wiring from the wiring board has to be relatively increased. However, when the pressure is relatively increased, there is a possibility of the first colored layer present below the extension section of the detection wiring being compressed and deformed. If the first colored layer is compressed and deformed, when the pressure is removed, the first colored layer returns to an original shape. At this time, a stress is applied to the conductive particles contained in the adhesive member in a direction away from the extension section of the detection wiring. As a result, the extension section of the detection wiring and the conductive particles contained in the adhesive member are separated, and there is a possibility of the reliability of electrical connection between the extension section of the detection wiring and the wiring board being reduced.

Thus, in the input device X1, the extension section 8*a* is located on a part of the second main surface 2B of the substrate 2 in which the first colored layer 6 is not included. The extension section 8*a* is electrically connected to the wiring board 10 through the adhesive member T1 containing the conductive particles P1. Specifically, the adhesive member T1 is located between the extension section 8*a* and the wiring board 10. In other words, in the input device X1, the first colored layer 6 is not included below the extension section 8*a*. Therefore, in the manufacturing procedure of the input device X1, in a case of electrically connecting the detection wiring 8 and the wiring board 10, it is possible to reduce a possibility of a pressure applied to the extension section 8*a* from the wiring board 10 being reduced by the first colored layer 6. Therefore, it is possible to sufficiently press the adhesive member T1. Accordingly, it is possible to sufficiently press the conductive particles P1 included in the adhesive member T1 against the extension section 8*a*. In this manner, in the input device X1, it is possible to improve the reliability of electrical connection between the detection wiring 8 and the wiring board 10.

Further, in the input device X1, it is possible to reduce a possibility of a pressure applied to the extension section 8*a* from the wiring board 10 being reduced by the first colored layer 6, thereby relatively reducing the pressure. Therefore, it is possible to reduce the possibility that the cracking or breakage in the extension section 8*a* occurs due to the pressure.

In addition, as in the present embodiment, it is preferable that the extension section 8*a* overlap the first cut-out portion C1 in plan view. If the extension section 8*a* overlaps the first cut-out portion C1 in plan view, without enlarging the size of the input device X1, it is possible to improve the reliability of the electrical connection between the detection wiring 8 and the wiring board 10. In addition, the first cut-out portion C1 may not be provided in a part of the first colored layer 6. In this case, the extension section 8*a* may be located outside of the first colored layer 6 in plan view.

Further, as in the present embodiment, it is preferable that the extension section 8*a* be located in an area in which the first cut-out portion C1 and the second cut-out portion C2 overlap in plan view. In other words, it is preferable that the first colored layer 6 and the first protective layer 7 not be present below the extension section 8*a*. If the extension section 8*a* is located in an area in which the first cut-out portion C1 and the second cut-out portion C2 overlap in plan view, in a case of electrically connecting the extension section 8*a* and the wiring board 10, it is possible to reduce the possibility of a pressure applied to the extension section 8*a* from the wiring board 10 being reduced by the first colored layer 6 and the first protective layer 7. In addition, the second cut-out portion C2 may not be provided on a part of the first protective layer 7. In this case, the extension section 8*a* may be located outside of the first protective layer 7 in plan view.

In addition, as in the present embodiment, it is preferable that the surface of the second edge portion 7*a* of the first protective layer 7 form a curved shape and a part of the detection wiring 8 be provided on the second edge portion 7*a*. Specifically, it is preferable that a part of the detection wiring 8 be located on a curved surface which is the surface of the second edge portion 7*a*, and the extension section 8*a* be contiguous with a part of the detection wiring 8. According to such a configuration, in the case of repeatedly pressing the input device X1, it is possible to reduce the possibility of stress being concentrated on a part of the detection wiring 8 located on the second edge portion 7a. Therefore, as in the present embodiment, even if the detection wiring 8 extends from the first protective layer 7 to the second main surface 2B of the substrate 2 in which first protective layer 7 is not included, it is possible to reduce the possibility of the occurrence of peeling, cracking or the like in the detection wiring 8. In addition, the entirety of the surface of the second edge portion 7a does not need to be a curved surface, and only the surface located below a part of the detection wiring 8 may be a curved surface.

Further, as in the present embodiment, it is preferable that the surface of the first edge portion 6a of the first colored layer 6 form a curved shape and overlap the second edge portion 7a. If the surface of the first edge portion 6a forms a curved surface, the surface of the second edge portion 7a located on the first edge portion 6a is likely to form a curved shape.

Further, when the first protective layer 7 is not provided, it is preferable that the surface of the first edge portion 6a of the first colored layer 6 form a curved shape and a part of the detection wiring 8 be provided on the first edge portion 6a. Specifically, it is preferable that a part of the detection wiring 8 be located on the curved surface which is the surface of the first edge portion 6a and the extension section 8a contiguous with a part of the detection wiring 8. According to such a configuration, similar to the above description, it is possible to reduce the possibility of the occurrence of peeling, cracking or the like in the detection wiring 8. In addition, the entirety of the surface of the first edge portion 6a does not need to be a curved surface, and only the surface located below a part of the detection wiring 8 may be a curved surface.

Further, as in the present embodiment, it is preferable that the thickness D1 of the extension section 8a be thinner than the thickness D2 of the first colored layer 6. Specifically, it is preferable that the thickness D1 of the extension section 8a be thinner than the thickness D2 of a portion adjacent to the first edge portion 6a of the first colored layer 6. If the thickness D1 of the extension section 8a is thinner than the thickness D2 of the first colored layer 6, in a case in which the detection wiring 8 and the wiring board 10 are to be electrically connected, it is possible to reduce the possibility that the adhesive member T1 leaks to the outside of the first cut-out portion C1 by pressure applied to the extension section 8a from the wiring board 10.

The second protective layer 11 has a function of protecting the detection wiring 8 from corrosion by moisture absorption. The second protective layer 11 is provided on the first protective layer 7, in the non-input area E2. Further, the second protective layer 11 protects the part of the detection wiring 8 other than the extension section 8a. The constituent material and the formation method of the second protective layer 11 are the same as those of the first protective layer 7.

The third protective layer 12 has a function of protecting the first detection electrode pattern 3 and the second detection electrode pattern 4 so as not to be damaged by an external impact. The third protective layer 12 is provided on the second main surface 2B of the substrate 2 corresponding to the input area E1, and covers the first detection electrode pattern 3, the second detection electrode pattern 4, the insulator 5, and the connection wiring 9. The constituent material and the formation method of the third protective layer 12 are same as those of the first protective layer 7. In addition, the third protective layer 12 may be a member integrated with the second protective layer 11.

The protective sheet 13 has a function of protecting the first main surface 2A of the substrate 2 so as not to be damaged by the contact of the finger F1 of the user. The protective sheet 13 is provided over the entire surface of the first main surface 2A of the substrate 2 corresponding to the input area E1 and the non-input area E2 through the adhesive layer 14. In addition, the protective sheet 13 may be provided only on the first main surface 2A of the substrate 2 corresponding to the input area E1. Examples of the constituent material of the protective sheet 13 include, for example, glass or plastic. Further, examples of the constituent material of the adhesive layer 14 include, for example, an acryl based adhesive, a silicone based adhesive, a rubber based adhesive, or a urethane based adhesive. In addition, the protective sheet 13 may not be provided.

The second colored layer 15 has a function of decorating the input device X1. The second colored layer 15 is provided on the first main surface 2A of the substrate 2 corresponding to the non-input area E2. In addition, a part of the second colored layer 15 may be provided on the first main surface 2A of the substrate 2 corresponding to the input area E1. In the present embodiment, the second colored layer 15 is provided between the first main surface 2A and the protective sheet 13 of the substrate 2. Here, the second colored layer 15 overlaps the extension section 8a in plan view. Therefore, it is possible to reduce the possibility of the extension section 8a being viewed by the user.

In addition, as in the present embodiment, it is preferable that the second colored layer 15 overlap the entire of the first cut-out portion C1 in plan view. If the second colored layer 15 overlaps the entirety of the first cut-out portion C1 in plan view, when the input device X1 is incorporated into the display device Y1, it is possible to reduce the possibility of the light in the backlight 300 being viewed by the user through the first cut-out portion C1.

Further, in the present embodiment, the second colored layer 15 is present in the entire area corresponding to the non-input area E2, but is not limited thereto. The second colored layer may be located only in an area overlapping the first cut-out portion C1 of the non-input area E2 in plan view. According to such a configuration, the non-input area E2 includes an area that is decorated by the first colored layer 6 and an area that is decorated by the second colored layer 15. Thus, it is possible to improve the design of the input device X1, by coloring, for example, the first colored layer 6 and the second colored layer 15 in different colors. Here, the "different colors" means, for example, that at least any one of colors, brightness, and saturation in the Munsell display system are different.

Next, the detection principle of the input device X1 will be described.

A position detection driver which is not illustrated is electrically connected to the detection wiring 8 through the wiring board 10. Further, a power supply device which is not illustrated supplies a voltage to the first detection electrode pattern 3 and the second detection electrode pattern 4. Here, if the finger F1 which is a conductor is close to, is in contact with, or presses the first main surface 2A of the substrate 2 corresponding to the input area E1 through the protective sheet 13, the capacitance is generated between the finger F1 and the first detection electrode 3a and the second detection electrode 4a. The position detection driver normally detects the capacitance generated between the first detection electrode pattern 3 and the second detection electrode pattern 4, and detects the input position in which the user has performed an input operation, by a combination of the first detection electrode pattern 3 and the second detection electrode pattern 4 in which a capacitance of a predetermined value or more is detected. In this manner, the input device X1 is able to detect the input operation position.

In this manner, in the input device X1, it is possible to improve the reliability of electrical connection between the detection wiring 8 and the wiring board 10.

Next, a display device Y1 equipped with the input device X1 will be described with reference to FIG. 7.

Figure 7:
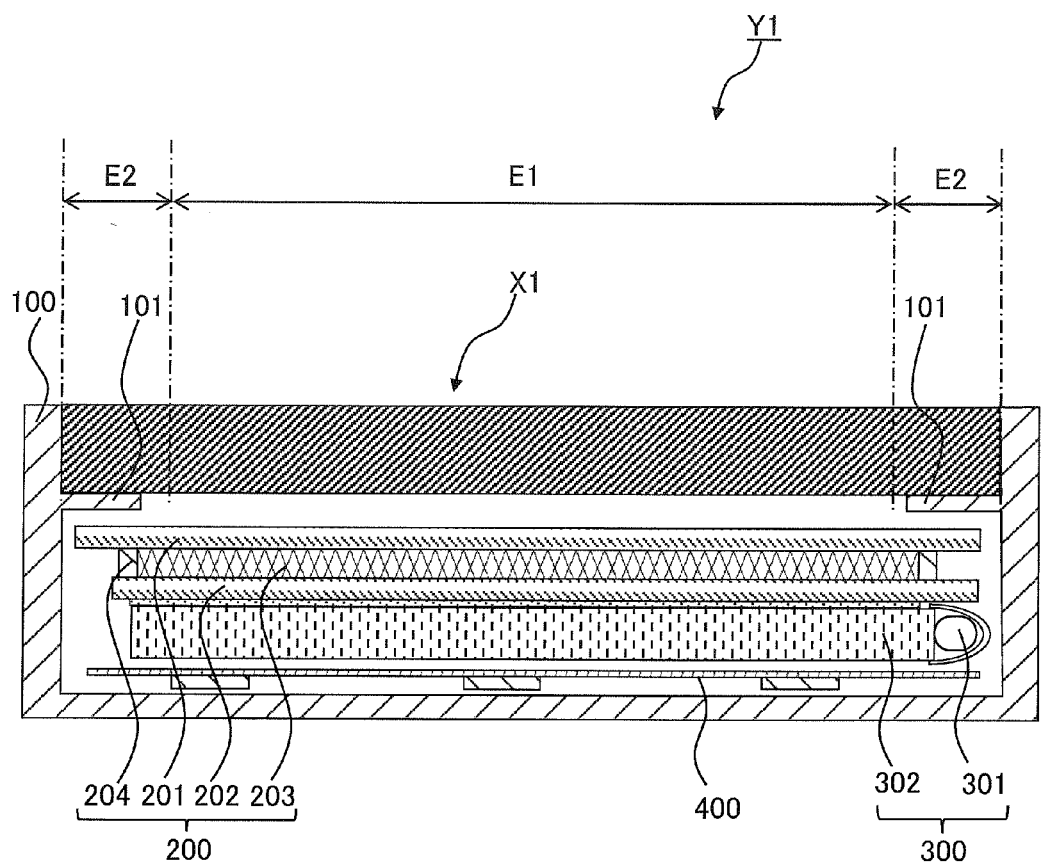
FIG. 7 is a sectional view illustrating a schematic configuration of a display device according to the present embodiment.

As illustrated in FIG. 7, the display device Y1 according to the present embodiment includes the input device X1, a first housing 100, a display panel 200, a backlight 300, and a circuit board 400.

The input device X1 is supported by the first housing 100. Specifically, the input device X1 is provided on a supporting portion 101 of the first housing 100. Examples of the constituent material of the first housing 100 include, for example, resin such as polycarbonate, or metals such as stainless steel or aluminum.

The display panel 200 has a function of displaying an image. The display panel 200 includes an upper substrate 201, a lower substrate 202, a liquid crystal layer 203, and a sealing member 204.

The upper substrate 201 is disposed to face the second main surface 2b of the substrate 2 of the input device X1. In addition, the input device X1 may be provided on the upper substrate 201 through a fixing member. Examples of the fixing member include, for example, a double sided tape, a thermosetting resin, optical adhesive member such as ultraviolet curable resin, or fasteners such as screws. In particular, for the purpose of improving visibility, it is preferable to use the optical adhesive member. The lower substrate 202 is disposed to face the upper substrate 201. Examples of the constituent material of the upper substrate 201 and the lower substrate 202 include, for example, transparent resin material such as glass or plastic.

The liquid crystal layer 203 is a display element layer for displaying an image, and is interposed between the upper substrate 201 and the lower substrate 202. Specifically, the liquid crystal layer 203 is sealed in an area between the upper substrate 201 and the lower substrate 202, by the upper substrate 201, the lower substrate 202, and the sealing member 204. In addition, the display panel 200 according to the present embodiment includes the liquid crystal layer 203 as a display element layer, but is not limited thereto. The display panel 200 may include a plasma generating layer or an organic EL layer instead of the liquid crystal layer 203.

The backlight 300 has a function of emitting light toward the entire lower surface of the display panel 200. The backlight 300 is disposed behind the display panel 200. The backlight 300 includes a light source 301 and a light guide plate 302. The light source 301 is a member performing a function of emitting light toward the light guide plate 302, and is configured with a light emitting diode (LED). In addition, the light source 301 may not be configured with the LED, but may be configured with, for example, a cold cathode fluorescent lamp, a halogen lamp, a xenon lamp, or an electroluminescence (EL). The light guide plate 302 is a member performing a function of substantially uniformly guiding light from the light source 301 over the entire lower surface of the display panel 200. In addition, when a display panel using a self-light emitting device is used instead of the display panel 200, the backlight 300 may not be provided.

The circuit board 400 has a function of supporting electronic components such as a control circuit of controlling the display panel 200 and the backlight 300, resistors or capacitors. The circuit board 400 is disposed behind the backlight 300. The control circuit located on the circuit board 400 is electrically connected to the display panel 200 and the backlight 300, by a flexible printed wiring board or the like which is not illustrated. In addition, the circuit board 400 may include a position detection driver of the input device X1. Further, a plurality of circuit boards 400 may be provided. Examples of the constituent material of the circuit board 400 include, for example, a resin material.

In this manner, the display device Y1 is able to receive various types of information by an input operation of the input area E1 of the input device X1 while being viewed through the input device X1, through the display panel 200. In addition, a function of transferring various sensations such as a pressing sensation, a tracing sensation, and a contact sensation may be given from the input device X1 to the user who inputs the information when various types of information are input. In this case, one or a plurality of vibrators (for example, a piezoelectric element or the like) are included in the substrate 2 of the input device X1, and those sensations can be realized by vibrating the vibrator at a predetermined frequency, when a predetermined input operation or a predetermined amount of pressure is detected.

In this manner, since the display device Y1 is equipped with the input device X1, it is possible to improve the reliability of the electrical connection between the detection wiring 8 and the wiring board 10.

Next, a mobile terminal Z1 having a display device Y1 will be described with reference to FIG. 8.

Figure 8:
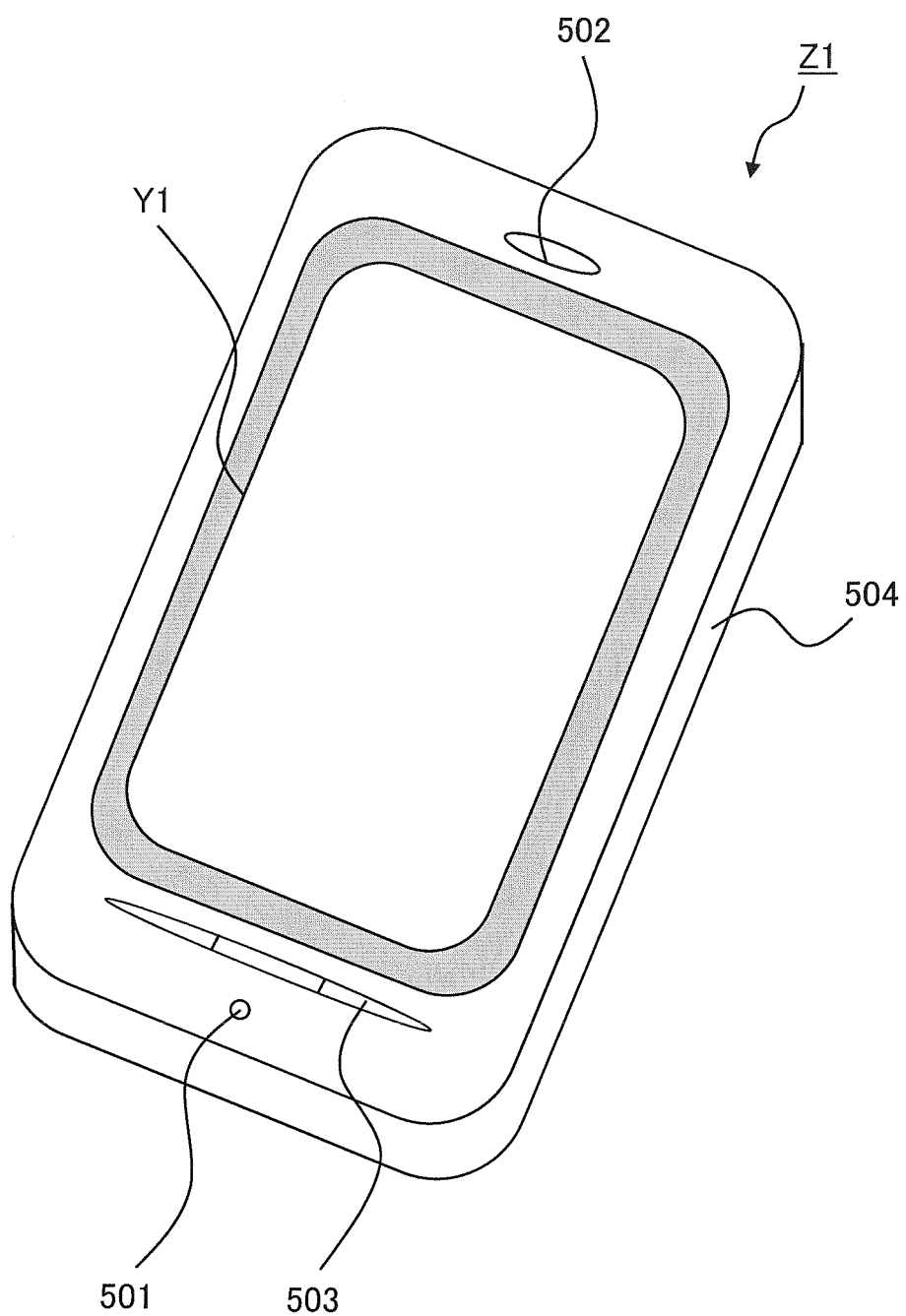
FIG. 8 is a perspective view illustrating a schematic configuration of a mobile terminal according to the present embodiment.

As illustrated in FIG. 8, the mobile terminal Z1 according to the present embodiment is a smart phone terminal. In addition, the mobile terminal Z1 is not limited to the smart phone terminal, but may be, for example, a mobile phone, a tablet terminal, a personal digital assistant (PDA) or the like. The mobile terminal Z1 includes a display device Y1, a voice input unit 501, a voice output unit 502, a key input unit 503, and a second housing 504. In addition, the display device Y1 and the second housing 504 are one embodiment of the electronic device according to the present invention.

The display device Y1, the voice input unit 501, the voice output unit 502, and the key input unit 503 are accommodated in the second housing 504. In addition, "being accommodated in the second housing 504" in the present specification does not require being completely surrounded by the second housing 504, but includes a case in which a part thereof is exposed from the second housing 504.

The voice input unit 501 has a function of inputting the voice or the like of the user, and is configured with a microphone or the like. The voice output unit 502 has a function of outputting the voice or the like from the other party, and is configured with an electromagnetic speaker, a piezoelectric speaker, or the like. In addition, when airway sound or bone conduction sound is generated by vibrating the substrate 2 of the input device X1, the display device Y1 is integrated with the voice output unit 502. The key input unit 503 is configured with mechanical keys. In addition, the key input unit 503 may be operation keys illustrated on a display screen. The second housing 504 has a function of accommodating the display device Y1, the voice input unit 501, the voice output unit 502, and the key input unit 503. In addition, the second housing 504 may not be provided, and the voice input unit 501, the voice output unit 502, and the key input unit 503 may be accommodated in the first housing 100 of the display device Y1. Examples of the constituent material of the second housing 504 are the same as those of the first housing 100 of the display device Y1.

In addition thereto, the mobile terminal Z1 includes a short-range wireless communication unit such as a digital camera function unit, an one-segment broadcasting tuner, an infrared communication function unit, a wireless LAN module, a Bluetooth (registered trademark) module, various interfaces, and the like as necessary to function, in some cases, however detailed illustration and description will be omitted.

In this manner, since the mobile terminal Z1 includes a display device Y1, it is possible to improve the reliability of the electrical connection between the detection wiring 8 and the wiring board 10.

Here, instead of the mobile terminal Z1, the display device Y1 may include various electronic devices such as electronic notebooks, personal computers, copying machines, terminal devices for games, TVs, digital cameras, or programmable display devices used in industrial applications.

In addition, the embodiments described above illustrate a specific example of embodiments of the present invention, and various modifications are possible. Here, some main variation examples will be illustrated.

Variation Example 1

Figure 9:
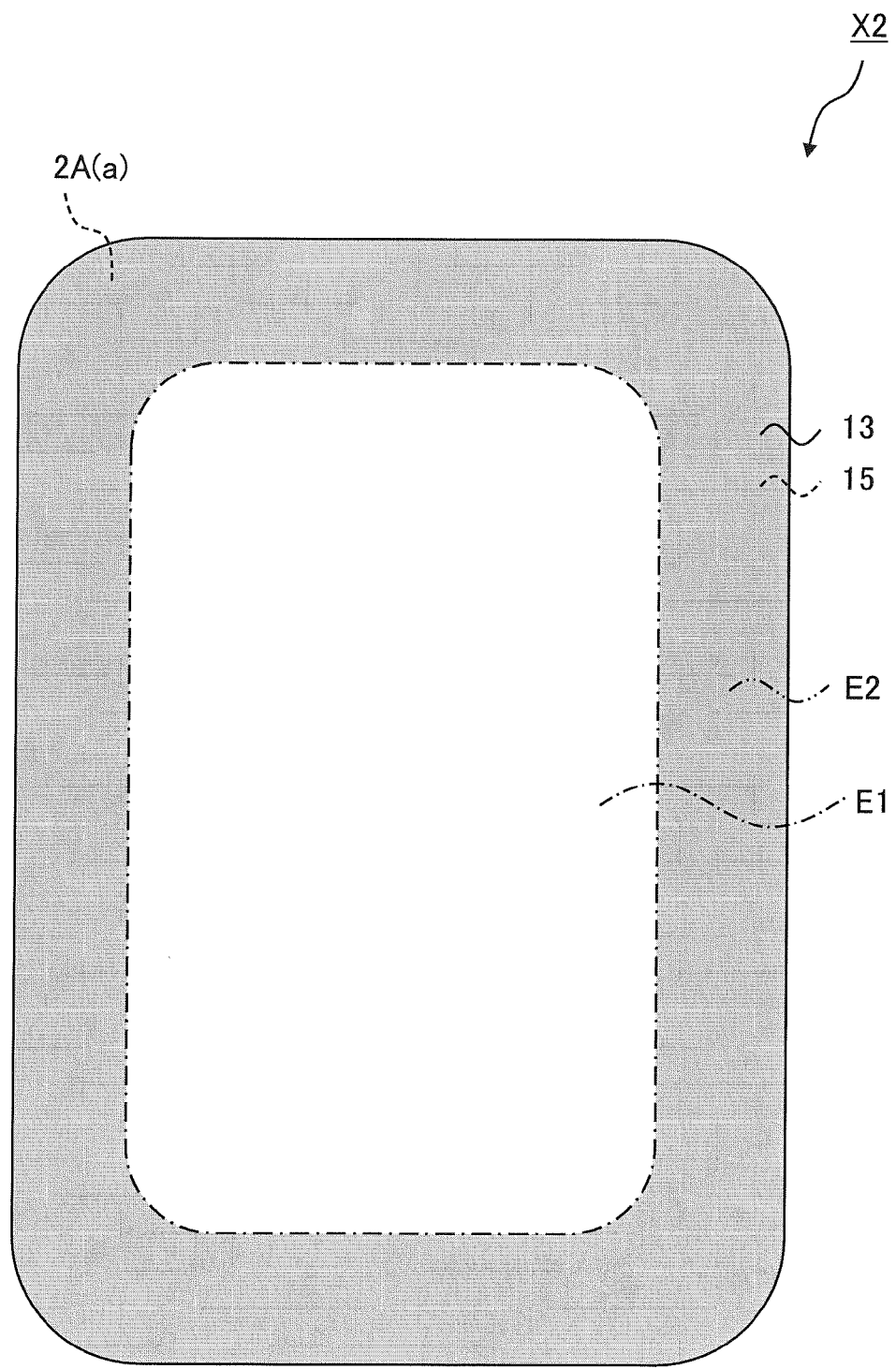
FIG. 9 is a plan view illustrating a schematic configuration of an input device according to Variation example 1.
Figure 10:
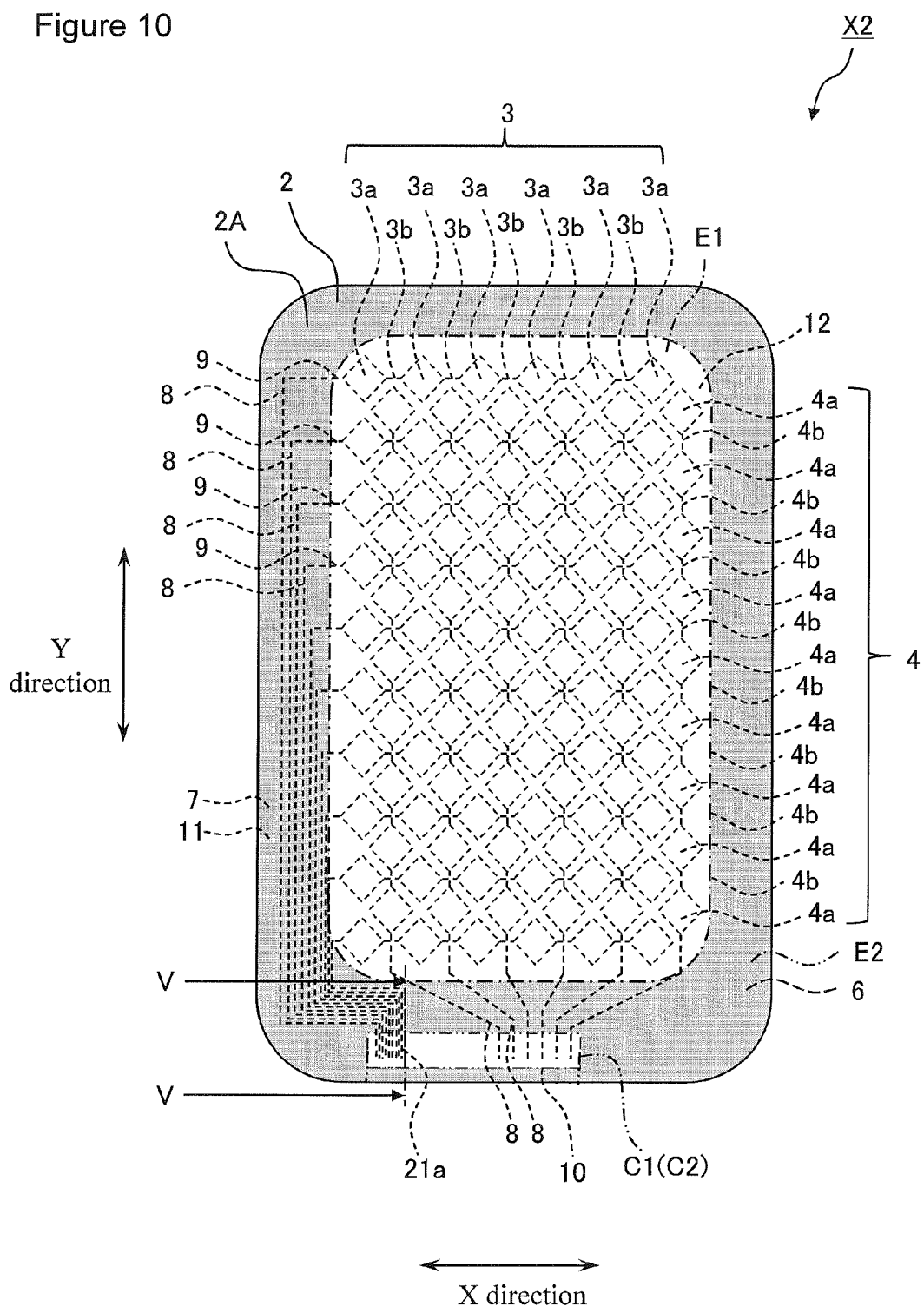
FIG. 10 is a plan view illustrating a schematic configuration of the input device according to Variation example 1, and a perspective view of the substrate.
Figure 11:
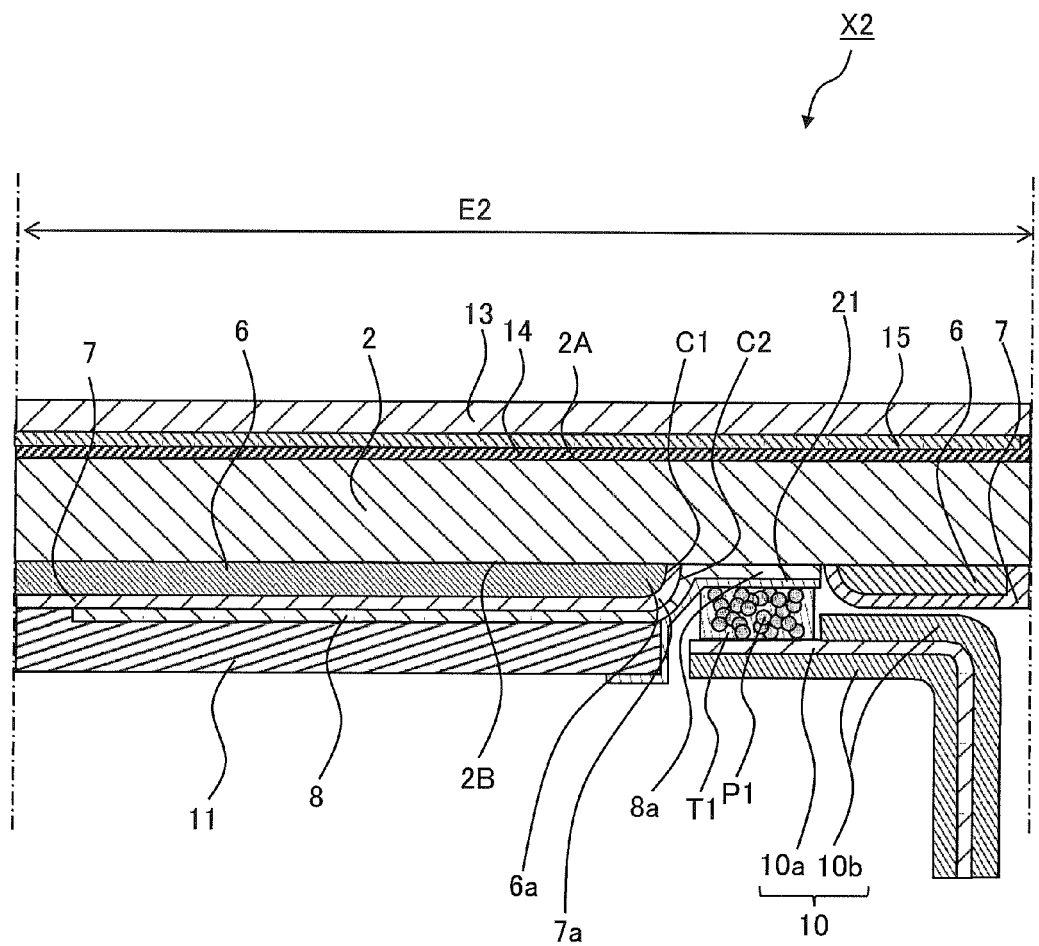
FIG. 11 is a sectional view taken along line V-V illustrated in FIG. 10.

FIG. 9 is a plan view illustrating a schematic configuration of an input device X2 according to Variation example 1. FIG. 10 is a plan view illustrating a schematic configuration of the input device X2 according to Variation example 1, and a perspective view of the substrate 2. FIG. 11 is a sectional view taken along line V-V illustrated in FIG. 10. In addition, in FIGS. 9 to 11, components having the same functions as those of FIGS. 1, 2, and 6 are denoted by the same reference symbols, and thus the detailed description thereof will be omitted. Further, in FIG. 10, for convenience of description, the illustration of the insulator 5, the protective sheet 13, the adhesive layer 14, and the second colored layer 15 is omitted.

As illustrated in FIGS. 9 to 11, the input device X2 further includes a conductive layer 21. The conductive layer 21 is provided on the extension section 8a, and is electrically connected to the wiring board 10 through the adhesive member T1. Therefore, it is possible to reduce a resistance value at a connection portion between the detection wiring 8 and the wiring board 10, and to reduce the possibility of the occurrence of a short-circuit in the connection portion. Further, when attempting to electrically connect the detection wiring 8 and the wiring board 10, it is possible to reduce the possibility that cracking or breakage in the extension section 8a occurs by the pressure applied to the extension section 8a from the wiring board 10. When cracking or breakage occurs in the conductive layer 21 by the pressure applied to the extension section from the wiring board 10, it is possible to electrically connect the detection wiring 8 and the wiring board 10.

In addition, as Variation example 1, it is preferable that a part of the conductive layer 21 be located on the second protective layer 11. Specifically, it is preferable that the conductive layer 21 be provided from the second protective layer 11 to the extension section 8a. If a part of the conductive layer 21 is located on the second protective layer 11, it is possible to reduce the possibility that the second protective layer 11 is peeled off from the second main surface 2B of the substrate 2.

Further, the conductive layer 21 may cover the extension section 8a. In this case, it is preferable that the conductive layer 21 be made of material resistant to oxidation, as compared to the extension section 8a. According to such a configuration, for example, it is possible to reduce the possibility of the extension section 8a being oxidized by absorption of moisture in the atmosphere. Here, when the extension section 8a is made of the thin metal film described above, examples of the material resistant to oxidation as compared to the extension section 8a include, for example, the same material as those of the first detection electrode pattern 3 and the second detection electrode pattern 4.

Variation Example 2

Figure 12:
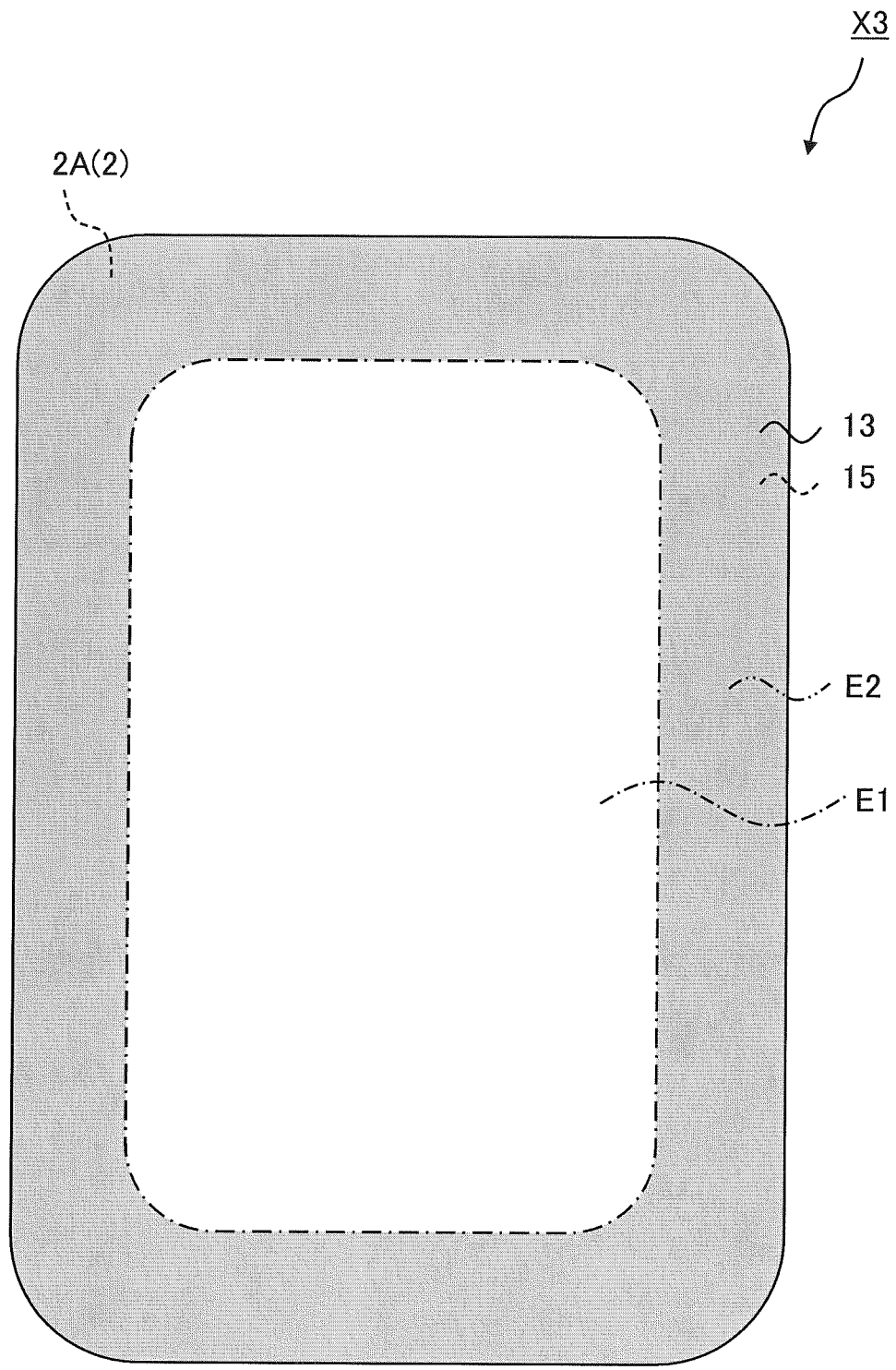
FIG. 12 is a plan view illustrating a schematic configuration of an input device according to Variation example 2.
Figure 13:
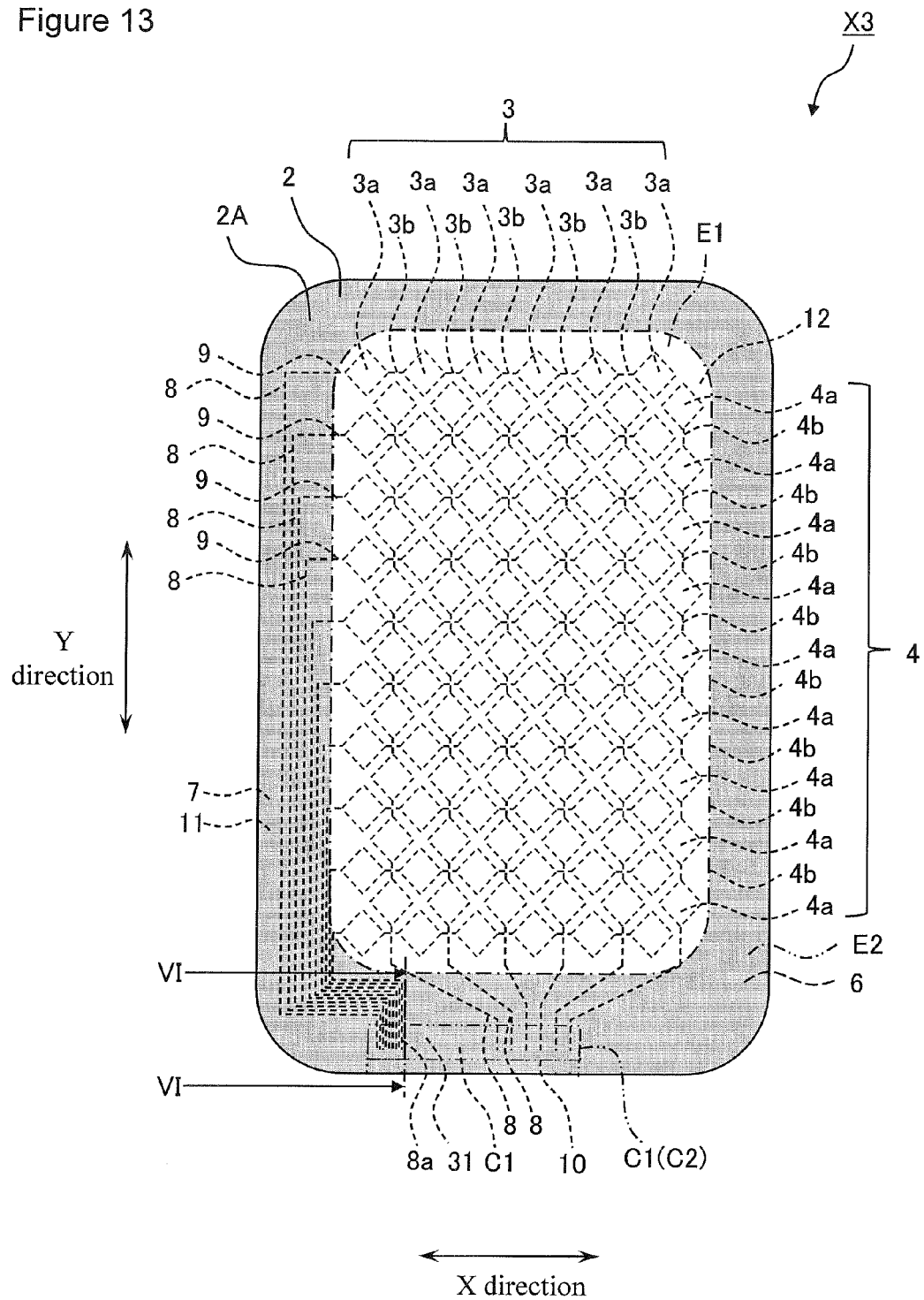
FIG. 13 is a plan view illustrating a schematic configuration of the input device according to Variation example 2, and a perspective view of the substrate.
Figure 14:
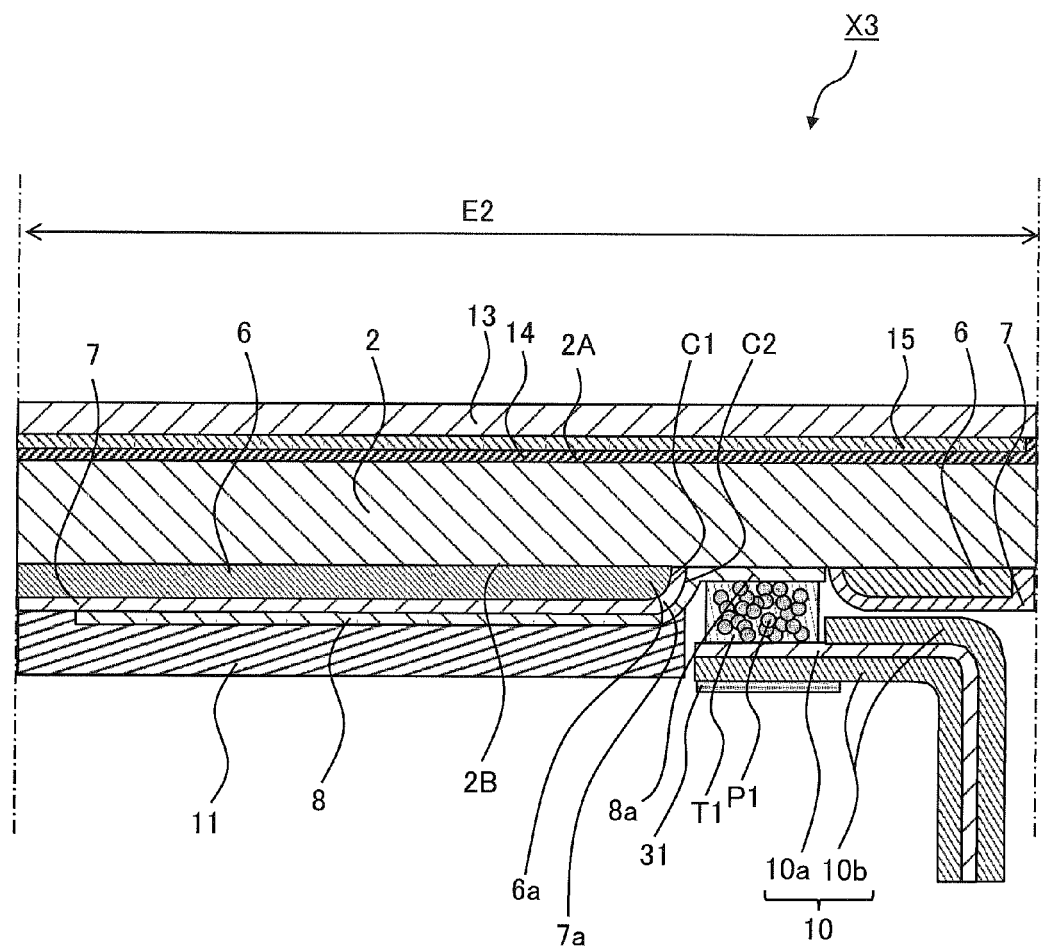
FIG. 14 is a sectional view taken along line VI-VI illustrated in FIG. 13.

FIG. 12 is a plan view illustrating a schematic configuration of an input device X3 according to Variation example 2. FIG. 13 is a plan view illustrating a schematic configuration of the input device X3 according to Variation example 2, and a perspective view of the substrate 2. FIG. 14 is a sectional view taken along line VI-VI illustrated in FIG. 13. In addition, in FIGS. 12 to 14, components having the same functions as those of FIGS. 1, 2, and 6 are denoted by the same reference symbols, and thus the detailed description thereof will be omitted. Further, in FIG. 13, for convenience of description, the illustration of the insulator 5, the protective sheet 13, the adhesive layer 14, and the second colored layer 15 is omitted.

As illustrated in FIGS. 12 to 14, the input device X3 further includes a light shielding layer 31. The light shielding layer 31 is provided on the insulating layer 10b of the wiring board 10. Further, the light shielding layer 31 is located to overlap the extension section 8a in plan view. Therefore, when the input device X3 is incorporated into the display device, the light shielding layer 31 can shield light emitted from the backlight to the extension section 8a. Therefore, even if the amount of the light is great, it is possible to reduce the possibility of the extension section 8a being viewed by the user through the second colored layer 15. In addition, in the input device X3, the light shielding layer 31 is provided on the insulating layer 10b of the wiring board 10 to overlap only the area in which the first cut-out portion C1 is located in plan view, but is not limited thereto. The light shielding layer 31 may be provided on the entire surface of the insulating layer 10b of the wiring board 10. Examples of the constituent material of the light shielding layer 31 may be the same as those of the first colored layer 6.

In addition, the light shielding layer 31 may have conductivity. If the light shielding layer 31 has conductivity, when the input device X3 instead of the input device X1 is incorporated into the display device Y1, the light shielding layer 31 shields the electromagnetic noise generated from the display panel 200. Therefore, the noise is mixed into the detection wiring 8, and thus it is possible to reduce the possibility of a decrease in the detection sensitivity of the input device X3. Examples of the constituent material of the light shielding layer 31 having conductivity include, for example, a silver paste or a resin material containing carbon.

Variation Example 3

Figure 15:
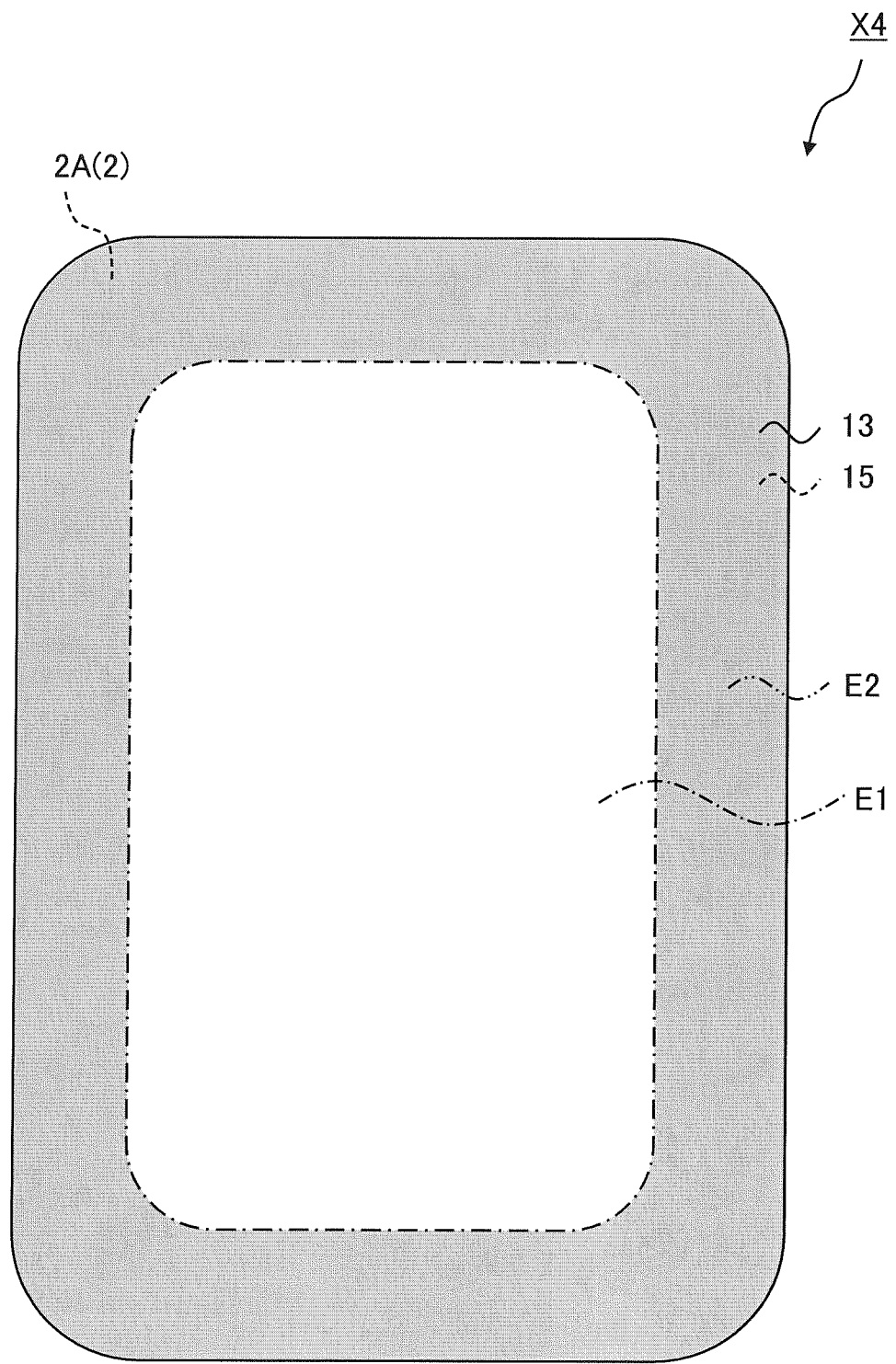
FIG. 15 is a plan view illustrating a schematic configuration of an input device according to Variation example 3.
Figure 16:
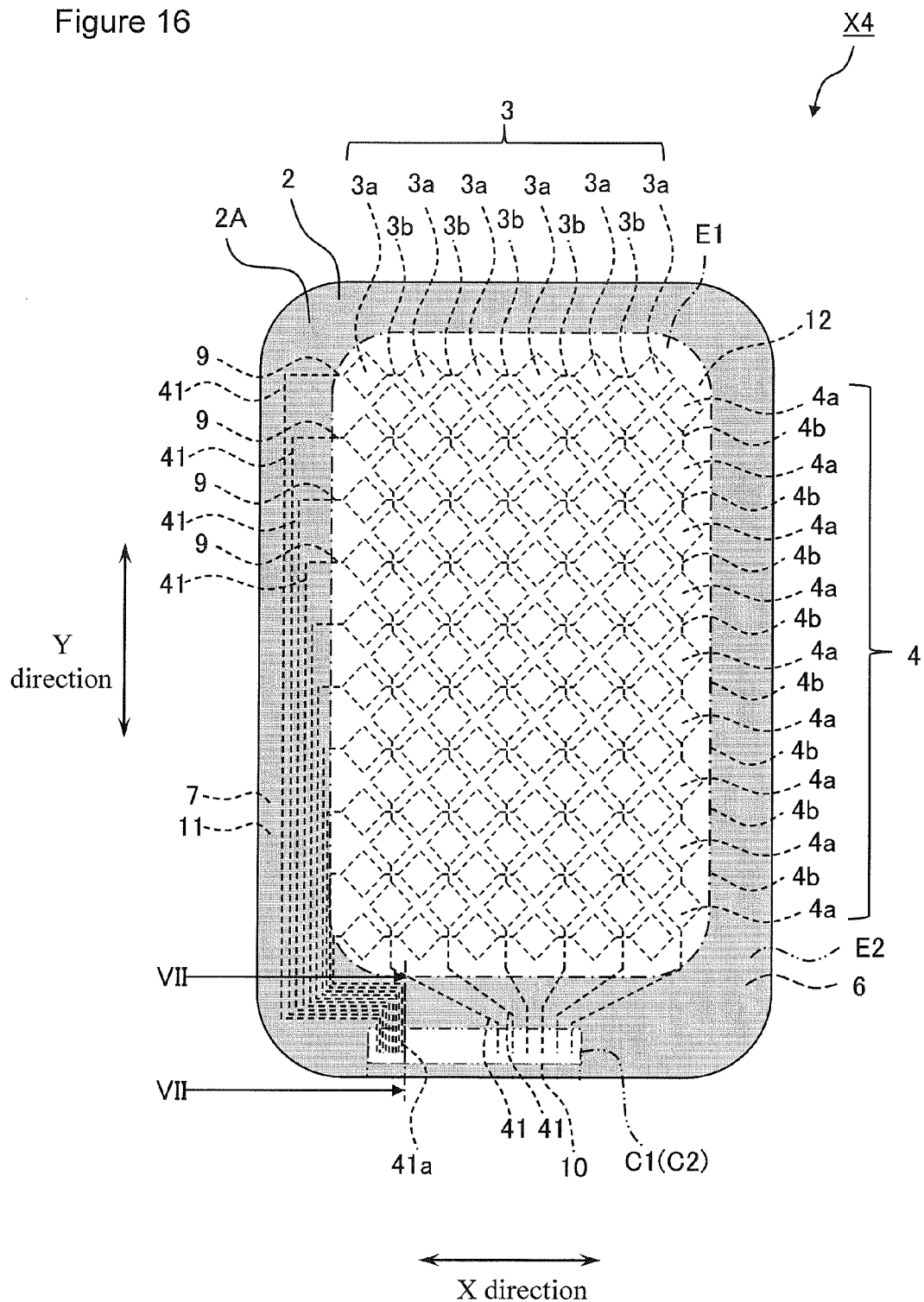
FIG. 16 is a plan view illustrating a schematic configuration of the input device according to Variation example 3, and a perspective view of the substrate.
Figure 17:
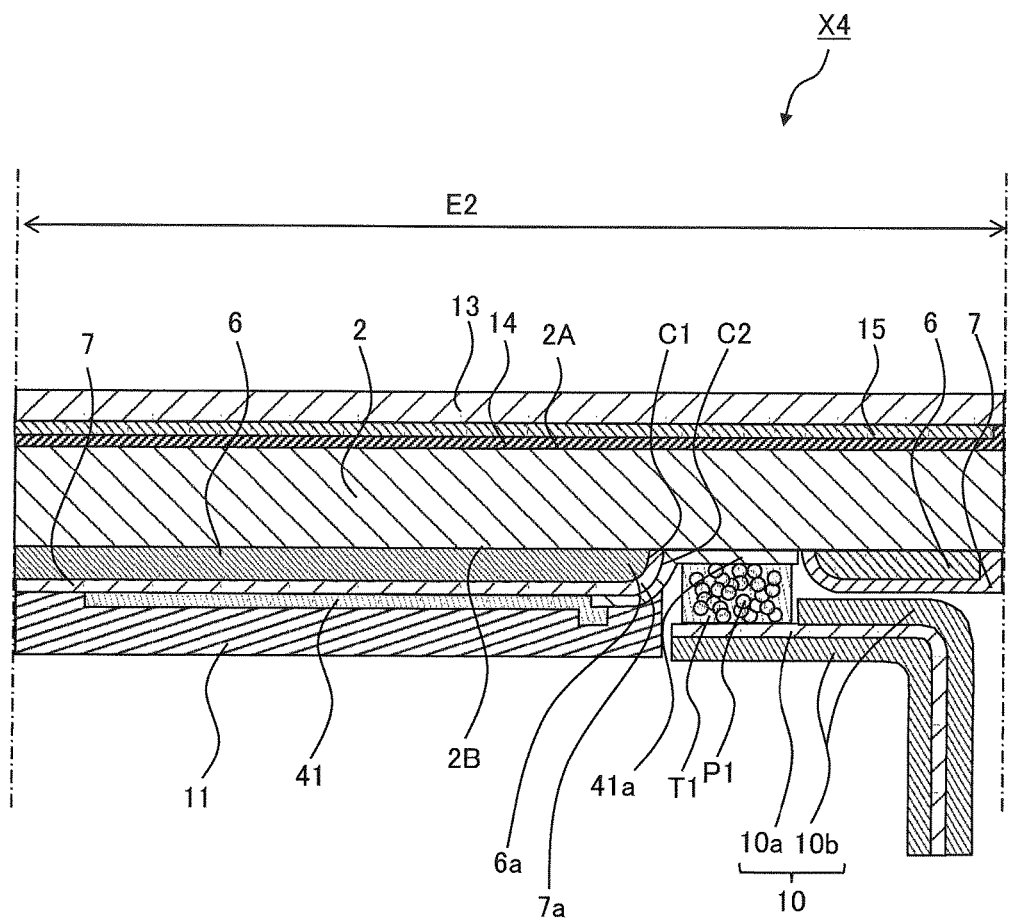
FIG. 17 is a sectional view taken along line VII-VII illustrated in FIG. 16.

FIG. 15 is a plan view illustrating a schematic configuration of an input device X4 according to Variation example 3. FIG. 16 is a plan view illustrating a schematic configuration of the input device X4 according to Variation example 3, and a perspective view of the substrate 2. FIG. 17 is a sectional view taken along line VII-VII illustrated in FIG. 16. In addition, in FIGS. 15 to 17, components having the same functions as those of FIGS. 1, 2, and 6 are denoted by the same reference symbols, and thus the detailed description thereof will be omitted. Further, in FIG. 16, for convenience of description, the illustration of the insulator 5, the protective sheet 13, the adhesive layer 14, and the second colored layer 15 is omitted.

As illustrated in FIGS. 15 to 17, the input device X4 further includes a detection wiring 41, instead of the detection wiring 8 included in the input device X1. The detection wiring 41 extends on the second main surface 2B of the substrate 2 in which the first colored layer 6 and the first protective layer 7 are not included, from the first colored layer 6 and the first protective layer 7. In Variation example 3, the detection wiring 41 located on the second main surface 2B of the substrate 2 in which the first colored layer 6 and the first protective layer 7 are not included is referred to as an extension section 41a. The extension section 41a is made of a conductive member having a light-transmitting property, and the detection wiring 41 other than the extension section 41a is made of a metal film. Therefore, when attempting to electrically connect the detection wiring 41 and the wiring board 10 in the step prior to providing the second colored layer 15 on the first main surface 2A of the substrate 2, it is possible to visually recognize the adhesive member T1 through the extension section 41a, from the first main surface 2A side of the substrate 2. Therefore, it is possible to check whether or not the adhesive member T1 is sufficiently pressed.

Examples of the conductive member having a light-transmitting property are the same as the constituent materials of the first detection electrode pattern 3 and the second detection electrode pattern 4. Further, examples of the metal film are the same as the constituent material of the detection wiring 8.

Variation Example 4

Figure 18:
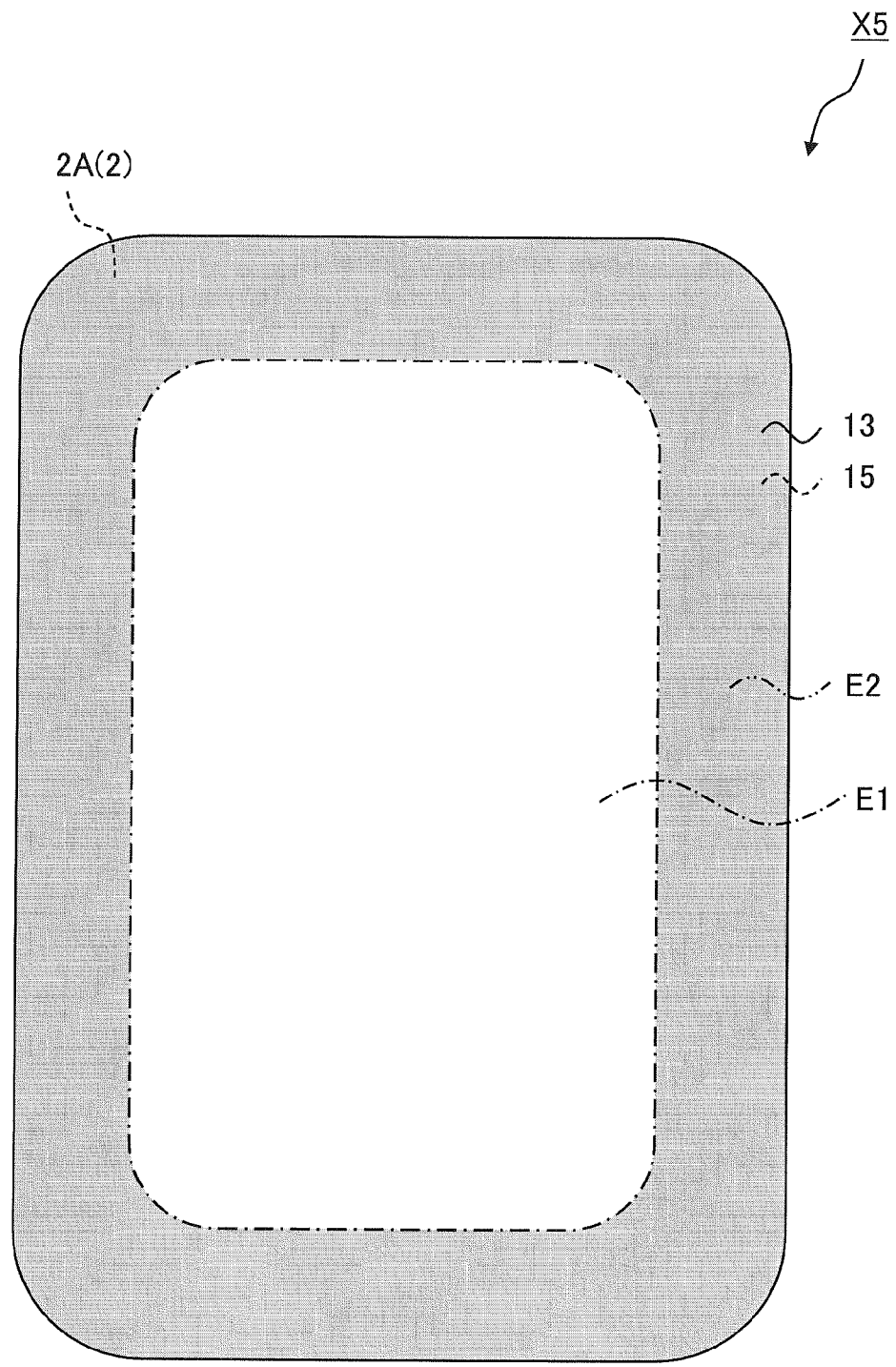
FIG. 18 is a plan view illustrating a schematic configuration of an input device according to Variation example 4.
Figure 19:
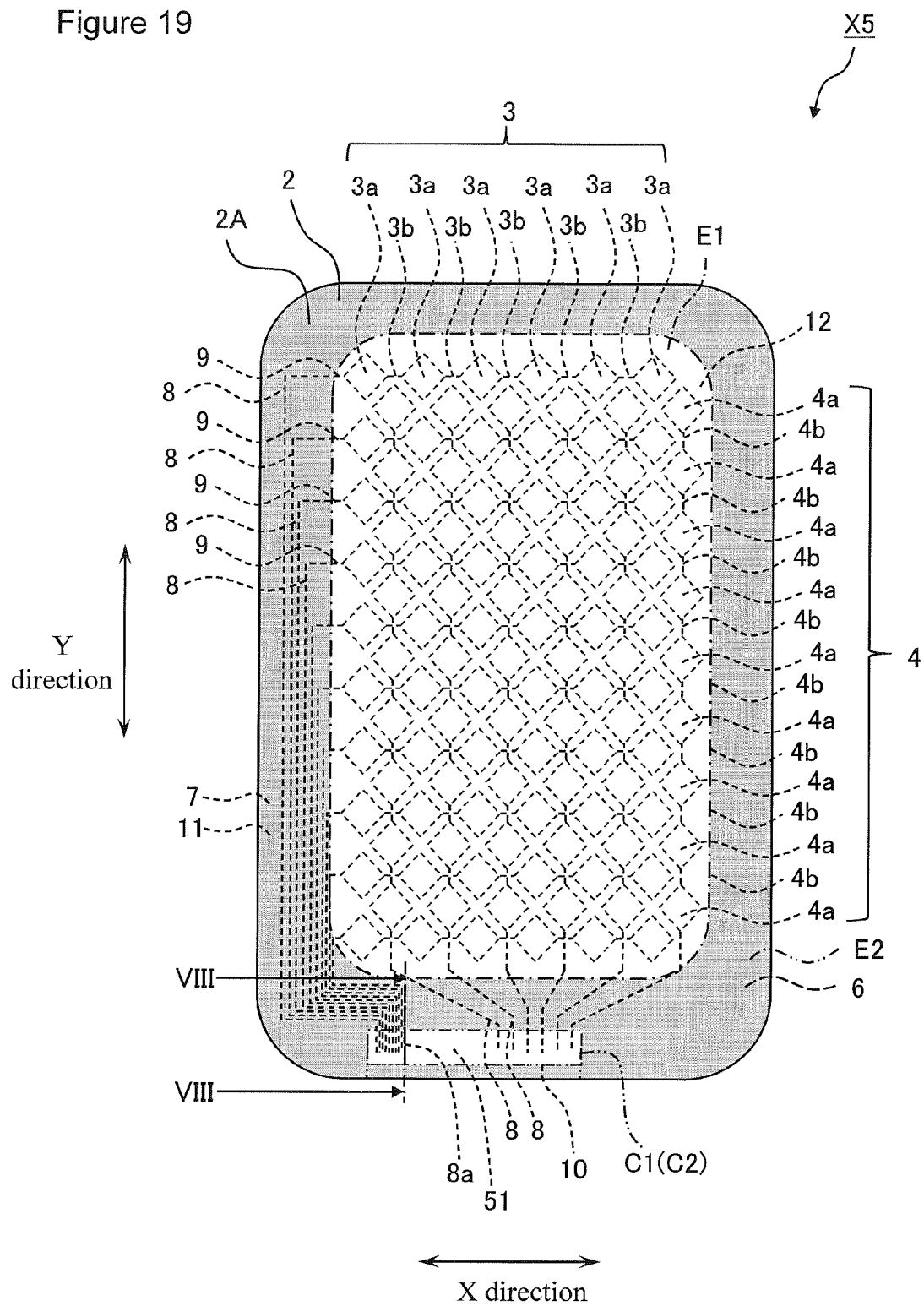
FIG. 19 is a plan view illustrating a schematic configuration of the input device according to Variation example 4, and a perspective view of the substrate.
Figure 20:
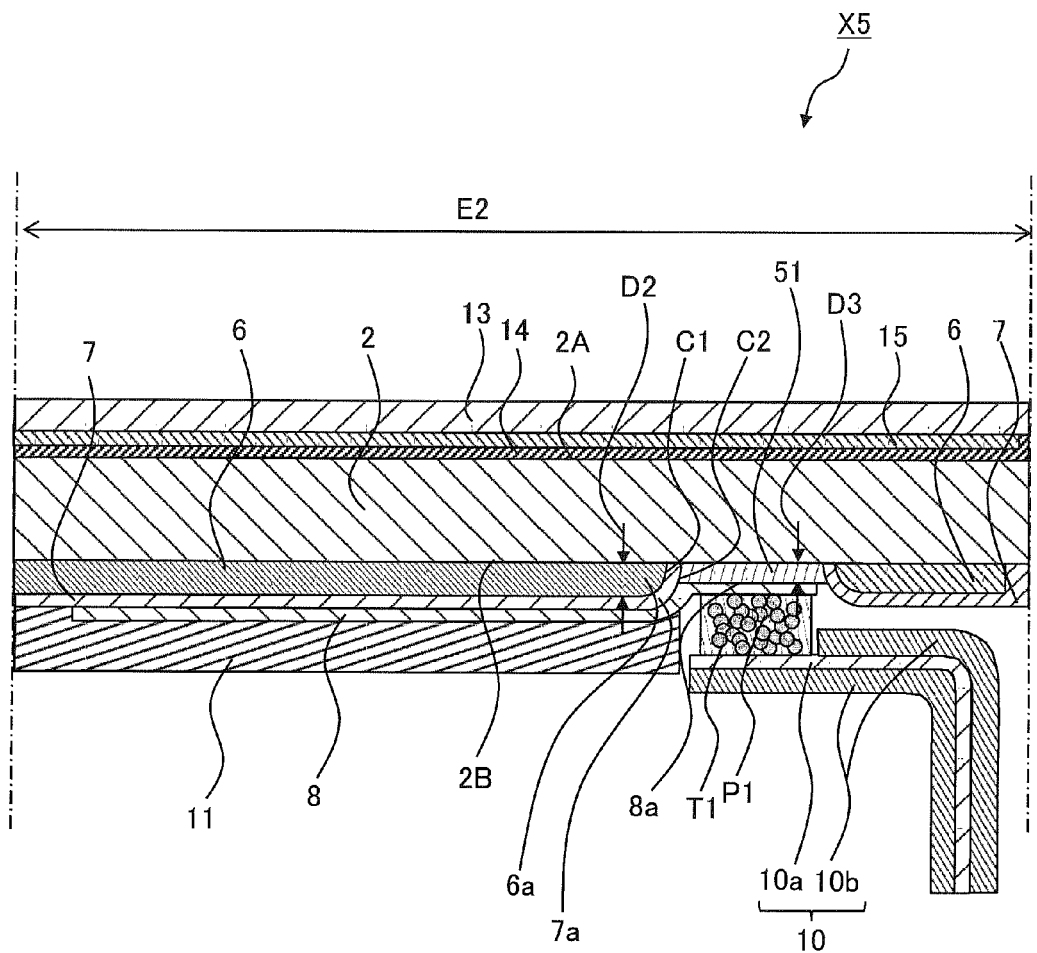
FIG. 20 is a sectional view taken along line VIII-VIII illustrated in FIG. 19.

FIG. 18 is a plan view illustrating a schematic configuration of an input device X5 according to Variation example 4. FIG. 19 is a plan view illustrating a schematic configuration of the input device X5 according to Variation example 4, and a perspective view of the substrate 2. FIG. 20 is a sectional view taken along line VIII-VIII illustrated in FIG. 19. In addition, in FIGS. 18 to 20, components having the same functions as those of FIGS. 1, 2, and 6 are denoted by the same reference symbols, and thus the detailed description thereof will be omitted. Further, in FIG. 19, for convenience of description, the illustration of the insulator 5, the protective sheet 13, the adhesive layer 14, and the second colored layer 15 is omitted.

As illustrated in FIGS. 18 to 20, the input layer X5 further includes an intermediate layer 51. The intermediate layer 51 is provided between the second main surface 2B and the extension section 8a of the substrate 2. Specifically, the intermediate layer 51 is located in an area in which the first cut-out portion C1 and the second cut-out portion C2 overlap in plan view, and is provided on the second main surface 2B of the substrate 2. The detection wiring 8 extends to the intermediate layer 51 from the first colored layer 6 and first protective layer 7. The detection wiring 8 extended to the intermediate layer 51 is an extension section 8a. Here, the intermediate layer 51 is harder than the first colored layer 6. Therefore, in the input device X5, it is possible to improve the reliability of the electrical connection between the detection wiring 8 and the wiring board 10, as compared to the input device in the related art in which the first colored layer extends below the extension section.

In addition, "the intermediate layer 51 being harder than the first colored layer 6" means, for example, "the elastic modulus of the intermediate layer 51 being higher than the elastic modulus of the first colored layer 6". In other words, when the intermediate layer 51 and the first colored layer 6 are pressed in a predetermined area and with a predetermined load, the deformation amount of the intermediate layer 51 may be smaller than the deformation amount of the first colored layer 6.

In addition, as in Variation example 4, it is preferable that the difference between the thickness D3 of the intermediate layer 51 and the thickness D2 of the first colored layer 6 be thinner than the thickness D2 of the first colored layer 6. Here, in the input device X1, a step difference of at least thickness D2 of the first colored layer 6 has occurred between the extension section 6a and the detection wiring 6 being contiguous with the extension section 6a. In the input device X5, it is possible to reduce the step difference as compared to the input device X1. Therefore, it is possible to reduce the possibility of the occurrence of breakage in the detection wiring 8.

Variation Example 5

In addition, the embodiments and Variation examples 1 to 4 have been described individually and specifically in the present specification, but the present invention is not limited thereto. Examples in which the individually described items of the embodiments and Variation examples 1 to 4 are appropriately combined have been described. In other words, the input device according to the present invention is not limited to the input devices X1 to X5, and includes an input device in which the individually described items of the embodiments and Variation examples 1 to 4 are appropriately combined.

Further, in the present embodiment, the display device Y1 including the input device X1 has been described, but is not limited thereto. Instead of the input device X1, the input devices X2 to X5 may be employed.

Further, in the present embodiment, the mobile terminal Z1 including the input device X1 has been described, but is not limited thereto. Instead of the input device X1, the input devices X2 to X5 may be employed.

REFERENCE SIGNS LIST

X1 to X5 INPUT DEVICE
Y1 DISPLAY DEVICE
Z1 MOBILE TERMINAL (ELECTRONIC DEVICE)
C1 FIRST CUT-OUT PORTION
C2 SECOND CUT-OUT PORTION
T1 ADHESIVE MEMBER
P1 CONDUCTIVE PARTICLES
2 SUBSTRATE
2A FIRST MAIN SURFACE
2B SECOND MAIN SURFACE
3a FIRST DETECTION ELECTRODE
4a SECOND DETECTION ELECTRODE
6 FIRST COLORED LAYER
7 FIRST PROTECTIVE LAYER (PROTECTIVE LAYER)
8, 41 DETECTION WIRING
8a, 41a EXTENSION SECTION OF DETECTION WIRING
10 WIRING BOARD
15 SECOND COLORED LAYER
21 CONDUCTIVE LAYER
31 LIGHT SHIELDING LAYER
51 FIRST HOUSING (HOUSING) OF INTERMEDIATE LAYER 100

200 DISPLAY PANEL
501 VOICE INPUT UNIT
502 VOICE OUTPUT UNIT
504 SECOND HOUSING (HOUSING)

The invention claimed is:

1. An input device comprising:
   a substrate;
   a first colored layer that is provided on the substrate;
   a detection electrode that is provided on the substrate;
   a detection wiring that is provided on the first colored layer and is electrically connected to the detection electrode; and
   a wiring board that is electrically connected to the detection wiring through an adhesive member containing conductive particles,
   wherein the detection wiring extends from a position on the first colored layer to a position on a part of the substrate in which the first colored layer is not included, and
   wherein the adhesive member is located between the wiring board and an extension section of the detection wiring located on a part of the substrate in which the first colored layer is not included.

2. The input device according to claim 1,
   wherein a first cut-out portion is provided on a part of the first colored layer, and
   wherein the extension section overlaps the first cut-out portion in plan view.

3. The input device according to claim 2,
   wherein a thickness of the extension section is smaller than a thickness of the first colored layer.

4. The input device according to claim 1,
   wherein a surface of a first edge portion of the first colored layer forms a curved surface,
   wherein a part of the detection wiring is provided on the first edge portion, and
   wherein the extension section is contiguous with a part of the detection wiring on the first edge portion.

5. The input device according to claim 1, further comprising:
   a protective layer on the first colored layer,
   wherein the detection wiring is located on the protective layer, and
   wherein the extension section is located on a part of the substrate in which the first colored layer and the protective layer are not included.

6. The input device according to claim 2, further comprising:
   a protective layer on the first colored layer,
   wherein the detection wiring is located on the protective layer,
   wherein a second cut-out portion is provided corresponding to the first cut-out portion on a part of the protective layer, and
   wherein the extension section is disposed in an area in which the first cut-out portion and the second cut-out portion overlap when seen in plan view.

7. The input device according to claim 5,
   wherein a surface of a second edge portion of the protective layer forms a curved surface,
   wherein a part of the detection wiring is provided on the second edge portion, and
   wherein the extension section is contiguous with a part of the detection wiring on the second edge portion.

8. The input device according to claim 1, further comprising:
   a conductive layer on the extension section,
   wherein the conductive layer is electrically connected to the wiring board through the adhesive member.

9. The input device according to claim 1,
   wherein the substrate includes a first main surface and a second main surface located on a side opposite to the first main surface,
   wherein the first main surface is located closer to an input operation side than the second main surface, and
   wherein the first colored layer, the detection electrode, and the detection wiring are provided on the second main surface side.

10. The input device according to claim 9, further comprising:
    a second colored layer on the first main surface of the substrate,
    wherein the second colored layer overlaps the extension section in plan view.

11. The input device according to claim 1, further comprising:
    a light shielding layer on the wiring board,
    wherein the light shielding layer overlaps the extension section in plan view.

12. The input device according to claim 11,
    wherein the light shielding layer has conductivity.

13. The input device according to claim 1,
    wherein the extension section is made of a conductive member having a light-transmitting property.

14. The input device according to claim 1, further comprising:
    an intermediate layer between the substrate and the extension section,
    wherein the detection wiring extends on the intermediate layer from a position on the first colored layer, and
    wherein the intermediate layer is harder than the first colored layer.

15. The input device according to claim 14,
    wherein a thickness difference between the intermediate layer and the first colored layer is smaller than a thickness of the first colored layer.

16. The input device according to claim 1,
    wherein the substrate is harder than the first colored layer.

17. A display device comprising:
    the input device according to claim 1; and
    a display panel located to face the input device.

18. An electronic device comprising:
    the display device according to claim 17; and
    a housing in which the display device is accommodated.

19. A mobile terminal comprising:
    the display device according to claim 17;
    a voice input unit;
    a voice output unit; and
    a housing in which the display device, the voice input unit, and the voice output unit are accommodated.

* * * * *